United States Patent [19] [11] 3,910,872
Riniker et al. [45] Oct. 7, 1975

[54] HYPOCALCAEMICALLY ACTIVE PEPTIDES RELATED TO HUMAN CALCITONIN

[75] Inventors: Bernhard Riniker, Frenkendorf; Werner Rittel, Basel, both of Switzerland

[73] Assignee: Ciba-Geigy Corporation, Ardsley, N.Y.

[22] Filed: Mar. 20, 1974

[21] Appl. No.: 453,148

[30] Foreign Application Priority Data
Mar. 28, 1973 Switzerland.......................... 4454/73
Dec. 14, 1973 Switzerland........................ 17549/73

[52] U.S. Cl.............................. 260/112.5; 424/177
[51] Int. Cl.²................. C07C 103/52; A61K 37/00
[58] Field of Search.................. 260/112.5, 112.5 T

[56] References Cited
UNITED STATES PATENTS
3,798,203  3/1974  Brugger et al. .................. 260/112.5

OTHER PUBLICATIONS
Dietrich et al., "Calcitonin 1969," Heinemann Medical Books, London, 1970, pp. 87–94.
Guttmann et al., "Calcitonin 1969," Heinemann Medical Books, London, 1970, pp. 74–79.
Dietrich et al., Nature, 225, pp. 75–76, (1970).
Brewer et al., J. Biol. Chem., 245, pp. 4238–4239, (1970).

*Primary Examiner*—Lewis Gotts
*Assistant Examiner*—Reginald J. Suyat
*Attorney, Agent, or Firm*—Joseph G. Kolodny; John J. Maitner; Theodore O. Groeger

[57] ABSTRACT

The new hypocalcaemic peptides of the formula

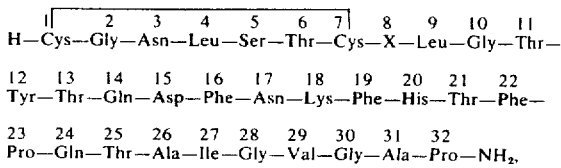

wherein X represents the L-methionine, L-valine, L-norvaline, L-leucine, L-isoleucine, L-norleucine or L-α-aminobutyric acid radical, above all the L-methionine or L-valine radical, and wherein L-alanine[26] is replaced by L-asparagine and/or L-isoleucine[27] is replaced by L-threonine, and wherein optionally one or more of the aminoacids in positions 11, 12, 16, 19, 22 and 24 is or are replaced by another aminoacid, namely L-threonine[11] by L-lysine, L-tyrosine[12] by L-leucine, L-phenylalanine[16] by L-leucine, L-phenylalanine[19] by L-leucine, L-phenylalanine[22] by L-tyrosine and L-glutamine[24] by L-arginine.

10 Claims, No Drawings

HYPOCALCAEMICALLY ACTIVE PEPTIDES RELATED TO HUMAN CALCITONIN

The invention relates to new hypocalcaemically active peptides of the formula I

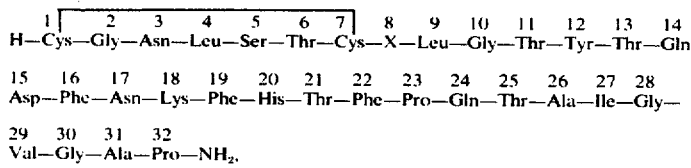

wherein X represents the L-methionine, L-valine, L-norvaline, L-leucine, L-isoleucine, L-norleucine or L-α-aminobutyric acid radical, above all the L-methionine or L-valine radical, and wherein L-alanine[26] is replaced by L-asparagine and/or L-isoleucine[27] is replaced by L-threonine, and wherein optionally one or more of the aminoacids in positions 11, 12, 16, 19, 22 and 24 is or are replaced by another aminoacid, namely L-threonine[11] by L-lysine, L-tyrosine[12] by L-leucine, L-phenylalanine[16] by L-leucine, L-phenylalanine[19] by L-leucine, L-phenylalanine[22] by L-tyrosine and L-glutamine[24] by L-arginine, their derivatives and acid addition salts and complexes of these compounds, and processes for their manufacture.

As derivatives there should above all be mentioned $N^\alpha$-acyl derivatives and desamino[1]-peptides.

Acyl groups for the acylation of the $N^\alpha$-amino group are the radicals of carboxylic acids such as aliphatic, aromatic, araliphatic, heterocyclic and heterocyclyl-aliphatic carboxylic acids, especially of lower monobasic or dibasic alkanoic or alkenoic acids, above all lower alkanoic acids with 1–4 carbon atoms such as formic acid, acetic acid, propionic acid and butyric acids and also acrylic acid and succinic acid, of alicyclic carboxylic acids such as cycloalkylcarboxylic acids, such as unsubstituted and substituted benzoic acid or phthalic acid, of unsubstituted and aryl-substituted aryl-lower alkyl- or alkenyl-carboxylic acids such as phenylacetic acid, of unsubstituted or substituted monobasic or dibasic 5-membered to 6-membered heterocyclic acids with nitrogen, sulphur and/or oxygen as hetero-atoms, such as pyridinecarboxylic acids and thiophenecarboxylic acids, or of heterocyclyl-lower alkanoic acids, such as pyridylacetic acid and imidazolylacetic acid, wherein the substituents of the rings are, for example, halogen atoms, nitro groups, lower alkyl or lower alkoxy groups or lower carbalkoxy groups. Further acyl radicals to be mentioned are above all acyl radicals of aminoacids, especially of α-aminoacids, such as, for example, glycyl; L-leucyl and L-pyroglutamyl, and also acyl radicals which are derived from carbonic acid or thiocarbonic acid or their esters or amides, for example lower alkoxycarbonyl groups, such as ethoxycarbonyl and tert.-butoxycarbonyl, and also benzyloxycarbonyl which is unsubstituted or substituted as indicated above, carbamoyl and thiocarbamoyl and N-substituted carbamoyl and thiocarbamoyl, for example N-lower alkylcarbamoyl, N-phenylcarbamoyl and N-phenylthiocarbamoyl.

As acid addition salts there should in particular be mentioned salts of therapeutically usable acids such as hydrochloric acid, acetic acid, sulphuric acid, phosphoric acid and sulphonic acids, such as lower alkanesulphonic acids, benzenesulphonic acid or toluenesulphonic acid.

By complexes there are to be understood the compounds, of as yet unclarified structure, which are produced on addition of certain inorganic or organic substances to long-chain peptides and impart a prolonged action thereto. Such substances have been described, for example, for ACTH and other adrenocorticotropically active peptides. As examples there should be mentioned inorganic compounds, which are derived from metals such as calcium, magnesium, aluminium, cobalt and especially zinc, above all sparingly soluble salts such as phosphates, pyrophosphates and polyphosphates, as well as hydroxides of these metals, and also alkali metal polyphosphates, such as, for example, "Calgon N", "Calgon 322", "Calgon 188" or "Polyron B 12". Organic compounds which prolong the action are, for example, non-antigenic gelatines, for example polyhydroxygelatine, polyvinylpyrrolidone and carboxymethylcellulose, and also sulphonic acid esters or phosphoric acid esters of alginic acid, dextran, polyphenols and polyalcohols, above all polyphoretine phosphate and phytic acid, and also polymers and copolymers of basic or, above all, acid aminoacids, for example protamine or polyglutamic acid.

The new compounds display a hypocalcaemic action. They lower the content of calcium and phosphate of the plasma of the blood of mammals, as has been demonstrated by experiments on rats. They can be used in hypocalcaemias, osteoporosis or osteitis deformans. The excretion of electrolytes in the urine is the same as in the case of human calcitonin, in contrast to salmon calcitonin, which produces powerful renal effects. For therapeutic purposes, doses of 0.005 to 0.5 mg of the new compounds are administered parenterally from one to seven times weekly as required. The daily doses should preferably not exceed 1 mg.

The compounds are obtained according to methods which are in themselves known, by condensing the aminoacids required for their synthesis, so as to form CONH bonds, in any desired time sequence, with functional groups not participating in the reaction being protected transiently and the cysteine radicals being oxidised to the cystine radical at any desired point in time. Thus they are obtained, above all, if the protective group or groups are eliminated from 1. compounds of the formula I

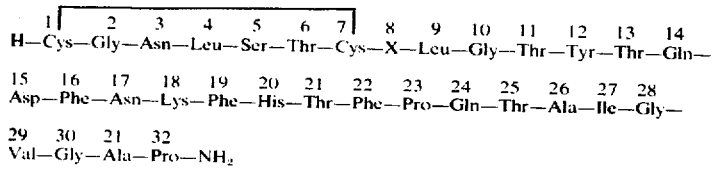

wherein X has the indicated meaning and L-alanine[26] is replaced by L-asparagine and/or L-isoleucine[27] is replaced by L-threonine and wherein optionally one or more of the aminoacids in positions 11, 12, 16, 19, 22 and 24 are replaced by the abovementioned aminoacids, or from their derivatives, in which compounds at least one amino group or one carboxyl group is protected by a protective group which can be eliminated, or 2. compounds of the formula II adamantyloxycarbonyl, isobornyloxycarbonyl, 2,2,2-trichloroethoxycarbonyl, 2-iodoethoxycarbonyl and above all tert.-butoxycarbonyl, as well as, for example, carbamoyl, thiocarbamoyl, N-phenylcarbamoyl and N-phenylthiocarbamoyl.

The amino groups can also be protected by forming enamines, obtained by reaction of the amino group with 1,3-diketones, for example benzoylacetone, acetylacetone or dimedone.

Carboxyl groups are protected, for example, by

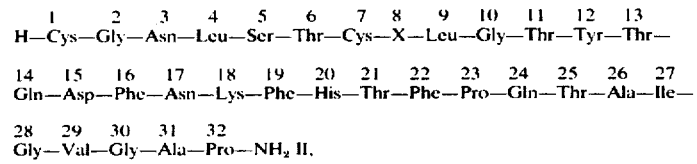

```
 1    2    3    4    5    6    7   8   9   10   11   12   13
H—Cys—Gly—Asn—Leu—Ser—Thr—Cys—X—Leu—Gly—Thr—Tyr—Thr—

14   15   16   17   18   19   20   21   22   23   24   25   26   27
Gln—Asp—Phe—Asn—Lys—Phe—His—Thr—Phe—Pro—Gln—Thr—Ala—Ile—

28   29   30   31   32
Gly—Val—Gly—Ala—Pro—NH₂ II,
``` wherein X has the indicated meaning and L-alanine[26] is replaced by L-asparagine and/or L-isoleucine[27] is replaced by L-threonine and wherein optionally one or more of the aminoacids in positions 11, 12, 16, 19, 22 and 24 is or are replaced by the abovementioned aminoacids, or their derivatives, wherein the mercapto groups are free or are protected by the trityl group or by an acylamidomethyl protective group, are oxidised to disulphides and, if desired, the resulting peptideamides are converted into their acid addition salts or complexes.

When manufacturing the starting materials for the 1st variant of the process according to the invention, and also manufacturing all intermediate products required for the 2 process variants, protective groups which can be used are in particular the protective groups which are known from the synthesis of longchain peptides and which can be split off easily, for example by hydrolysis, reduction, aminolysis or hydrazinolysis.

Examples of amino protective groups which should be mentioned are aryl-lower alkyl groups, such as diphenylmethyl or triphenylmethyl groups, which are optionally substituted, for example by halogen, nitro, lower alkyl or lower alkoxy, for example benzhydryl, trityl and di-paramethoxybenzhydryl, or acyl groups, such as formyl, trifluoroacetyl, phthaloyl, p-toluenesulphonyl, benzenesulphonyl, benzenesulphenyl and o-nitrophenylsulphenyl, or above all groups derived from carbonic acid or thiocarbonic acid, such as carbobenzoxy groups which are optionally substituted in the aromatic radical by halogen atoms, nitro groups or lower alkyl, lower alkoxy or lower carbalkoxy groups, for example carbobenzoxy, p-bromocarbobenzoxy or p-chlorocarbobenzoxy, p-nitrocarbobenzoxy and p-methoxycarbobenzoxy, coloured benzyloxycarbonyl groups such as p-phenylazo-benzyloxycarbonyl and p-(p'-methoxyphenylazo)benzyloxycarbonyl, tolyloxycarbonyl, 2-phenyl-isopropyloxycarbonyl, 2-tolylisopropoxycarbonyl and above all 2-(parabiphenylyl)-2-propoxycarbonyl, and also aliphatic oxycarbonyl groups such as, for example, allyloxycarbonyl, cyclopentyloxycarbonyl, tert.-amyloxycarbonyl, amide or hydrazide formation or by esterification. The amide and hydrazide groups can optionally be substituted, the amide group, for example, by the 3,4-dimethoxybenzyl or bis-(p-methoxyphenyl)-methyl group and the hydrazide group by, for example, the carbobenzoxy group, the trichloroethoxycarbonyl group, the trifluoroacetyl group, the trityl group, the tert.-butoxycarbonyl group or the 2-(p-biphenylyl)isopropoxycarbonyl group. Suitable compounds for esterification are, for example, lower optionally substituted alkanols such as methanol, ethanol, cyanomethyl alcohol, 2,2,2-trichloroethanol, 2-iodoethanol, benzoylmethyl alcohol or especially tert.-butanol, and also aralkanols such as aryl-lower alkanols, for example benzyl or benzhydryl alcohols optionally substituted by lower alkyl or lower alkoxy groups or halogen atoms, such as p-nitrobenzyl alcohol, p-methoxybenzyl alcohol or 2,4,6-trimethylbenzyl alcohol, phenols and thiophenols which are optionally substituted by electron-attracting substituents, such as phenol, thiophenol, thiocresol, p-nitrothiophenol, 2,4,5- and 2,4,6-trichlorophenol, pentachlorophenol, p-nitrophenol, 2,4-dinitrophenol, p-cyanophenol or p-methanesulphonylphenol, and also, for example, N-hydroxy-succinimide, N-hydroxyphthalimide, N-hydroxypiperidine and 8-hydroxyquinoline.

The hydroxyl groups of the serine, threonine and tyrosine radicals can be protected by, for example, esterification or etherification. Examples of suitable acyl radicals for the esterification are lower alkanoyl radicals such as acetyl, aroyl radicals such as benzoyl and above all radicals derived from carbonic acid such as benzyloxycarbonyl or ethoxycarbonyl. Groups suitable for the etherification are, for example, benzyl, tetrahydropyranyl or tert.-butyl radicals. The 2,2,2-trifluoro-1-tert.-butoxycarbonylamino- or -1-benzyloxycarbonylaminoethyl groups described in Ber. 100 (1967), 3838 – 3849 (Weygand) are also suitable for protection of the hydroxyl groups. However, the hydroxyl groups do not necessarily have to be protected.

The mercapto groups of the cysteine radicals are protected by, for example, acylation or alkylation. Examples of suitable radicals for the acylation are the acetyl or benzoyl radical, the ethylcarbamoyl radical or the optionally substituted carbobenzoxy radical. Examples of suitable radicals for the alkylation are the tert.-butyl or benzylthiomethyl radical or optionally substituted arylmethyl groups such as benzyl, p-nitrobenzyl, diphenylmethyl, dimethoxybenzhydryl or trityl, as well as phenylcyclohexyl, thienyl(2)-cyclohexyl and others, compare Ber. 101 (1968), 681, and also, for example, an acylamidomethyl radical, compare Tetrahedron Letters No. 26 (1968), page 3,057, or DOS 2,060,969. Acylamidomethyl is, for example, a group of the formula —$CH_2$—NH—CO—R, wherein CO—R denotes the acyl radical of a carboxylic acid such as of an aliphatic, aromatic, araliphatic or heterocyclic carboxylic acid or of a carbonic acid derivative, such as a carbonic acid ester or carbamic acid radical. Above all, R is an optionally substituted lower alkyl radical, for example a methyl, ethyl, propyl, isopropyl, n-butyl or tert.-butyl radical, which can, for example, contain chlorine, trifluoromethyl or the nitro group as substituents. Further, R is, for example, an optionally substituted cycloalkyl radical with 3–8, preferably 5–6, ring atoms, such as the cyclopentyl or cyclohexyl radical, or an optionally substituted aromatic or araliphatic radical, wherein the aromatic ring is preferably the benzene ring, above all optionally substituted phenyl or benzyl, for example phenyl or benzyl which are unsubstituted or substituted in the phenyl radical by lower alkyl, lower alkoxy, halogen or nitro, or a preferably monocyclic heterocyclyl radical which is optionally substituted as mentioned, for example a thienyl or furyl radical. In particular, acylamidomethyl represents acetylamidomethyl. It is not essential for the imino group of the histidine to be protected but it can be advantageous to protect it, for example by benzyl, trityl, carbobenzoxy, adamantyloxycarbonyl or the abovementioned Weygand's groups.

These protective groups can be split off in a known manner. Thus, the carbobenzoxy group can be split off by hydrogenolysis, the N-trityl group with mineral acids such as hydrogen halide acids, for example hydrogen fluoride or preferably hydrogen chloride, or with an organic acid such as formic acid, acetic acid, chloroacetic acid or trifluoroacetic acid in aqueous or absolute trifluoroethanol as the solvent, or with aqueous acetic acid, the tert.-butoxycarbonyl group with trifluoroacetic acid or hydrochloric acid, and the 2-(p-biphenylyl)-iospropoxycarbonyl group with aqueous acetic acid or, for example, with a mixture of glacial acetic acid, formic acid (82.8% strength) and water (7:1:2). The methyl ester can be converted into the hydrazide by means of hydrazine hydrate. The methyl ester or ethyl ester group is hydrolysed with dilute sodium hydroxide solution. The tert.-butyl ester is split with, for example, trifluoroacetic acid, as is the tert.-butyl ether.

Preferably, in the 1st variant of the process according to the invention, the tert.-butyl ester group is used to protect the carboxyl group of the side chain and optionally the terminal carboxyl group, the tert.-butoxycarbonyl group is used to protect the amino group of the side chain, the tert.-butyl ether group is used to protect the hydroxyl groups of the serine, threonine and tyrosine radicals, if these are protected at all, and, if desired, the 2,2,2-trifluoro-1-tert-butoxycarbonylaminoethyl group is used to protect the imino group of the histidine. All these protective groups can, if desired, be split off in one step by acid hydrolysis, for example by means of trifluoroacetic acid, hydrochloric acid or hydrogen fluoride.

In the 2nd process variant of the process according to the invention, the open-chain peptide used as the starting material can preferably again be prepared with the protected groups mentioned for variant 1).

The mercapto groups are preferably protected by benzyl, trityl or acylamidomethyl. The S-trityl groups can be split from the protected peptide selectively (whilst retaining the groups which can be split off with trifluoroacetic acid) in organic solution by means of mercuric acetate and hydrogen sulphide. The S-benzyl groups can be split selectively from the protected peptide by means of sodium in liquid ammonia. The S-acylamidomethyl groups can be split from the protected peptide by stirring the peptide, preferably at room temperature, in an aqueous solution of a water-soluble heavy metal salt, such as an acetate or nitrate, of mercury, silver, cadmium, tin and the like, or an organo-metal salt of a heavy metal. Not only water but also other solvents such as methanol, dimethylformamide or mixtures of these solvents can be used. In all cases, the protected peptide is obtained with free mercapto groups. This can be oxidised to the protected disulphide, for example with iodine in glacial acetic acid with diiodoethane in organic solvents or with atmospheric oxygen in liquid ammonia. It is particularly advantageous to protect the mercapto groups by trityl or acylamidomethyl groups and to remove these from the protected peptide, with simultaneous formation of the disulphide bridge, by means of iodine, for example in methanol or acetic acid. The formation of the disulphide ring can be effected at the stage of a partial sequence containing the two cysteine radicals, for example the decapeptide 1–10, or at the stage of the dotriacontapeptide-amide.

When manufacturing the N-acyl derivatives, the acyl group can be used as the amino protective group.

The peptides obtained can subsequently be converted into their acid addition salts and/or complexes in a manner which is in itself known.

The formation of acid addition salts is effected in a known manner.

The formation of complexes is also effected according to known methods or methods equivalent thereto.

Complexes with inorganic compounds such as sparingly soluble metal compounds, for example aluminium or zinc compounds, are preferably manufactured in an analogous manner to that known for ACTH, for example by reaction with a soluble salt of the metal in question, for example zinc chloride or zinc sulphate, and precipitation with an alkali metal phosphate and/or alkali metal hydroxide. Complexes with organic compounds such as polyhydroxygelatine, carboxymethylcellulose, polyvinylpyrrolidone, polyphloretine phosphate, polyglutamic acid and the like are obtained by mixing these substances with the peptide in aqueous solution. Insoluble compounds with alkali metal polyphosphates can also be manufactured in the same manner.

The invention also relates to those embodiments of the process in which an intermediate product obtainable at any stage of the process is used as the starting material and the missing steps are carried out or the process is discontinued at any stage and/or a starting material is formed in situ and/or is used in the form of a salt.

The peptides used as starting materials are obtained by linking the aminoacids, using — if required or desired — protective groups which can easily be split off, in the sequence mentioned, individually or after prior formation of smaller peptide units, the disulphide bridge being formed, if appropriate, at a suitable stage of the synthesis. Appropriately, the methods of linking suitable for the manufacture of long-chain peptides whilst taking the disulphide bridge into account, such as are known from the literature are used.

The linking of the aminoacid and/or peptide units is effected, for example, by reacting an aminoacid or a peptide having a protected α-amino group and activated terminal carboxyl group with an aminoacid or a peptide having a free α-amino group and free or protected, for example esterified or amidised terminal carboxyl group, or reacting an aminoacid or a peptide having an activated α-amino group and protected terminal carboxyl group with an aminoacid or a peptide having a free terminal carboxyl group and a protected α-amino group. The carboxyl group can be activated, for example, by conversion into an acid azide, acid anhydride, acid imidazolide or acid isoxazolide or an activated ester, such as a cyanomethyl ester, carboxymethyl ester, p-nitrophenyl thioester, p-nitrophenyl ester, 2,4,5-trichlorophenyl ester, pentachlorophenyl ester, N-hydroxysuccinimide ester, N-hydroxyphthalimide ester, 8-hydroxyquinoline ester or N-hydroxypiperidine ester or by reaction by means of a carbodiimide (optionally with the addition of N-hydroxysuccinimide or a 1-hydroxybenzotriazole which is unsubstituted by, for example, halogen, methyl or methoxy) or N,N'-carbonyl-diimidazole and the amino group, for example, by reaction with a phosphiteamide. The most customary methods to be mentioned are the carbodiimide method, the azide method, the method of the activated esters and the anhydride method, as well as the Merrifield method and the method of the N-carboxyanhydrides or N-thiocarboxyanhydrides.

When manufacturing the starting materials it is advantageous to start from a sequence which comprises the first 10 N-terminal aminoacids and to condense the entire remaining sequence with this N-terminal structure, preferably according to the Weygand-Wünsch method.

It is however also possible to link the said N-terminal sequence with, for example, the fragment up to the 28th aminoacid (glycine) having a free terminal carboxyl group and to condense the octacosapeptide with the tetrapeptide of the aminoacids 29 - 32, for example by the Weygand-Wünsch method.

The manufacture of the peptide of the formula I in which X represents L-methionine is explained below as an example of a preferred embodiment.

The N-terminal decapeptide (1–10) can be manufactured, for example, according to Helv. 53, 556 (1970).

The sequence to be linked to the N-terminal sequence 1–10 and comprising aminoacid 11 to 32 is synthesised, for example, from sequences 11–16, 17–20, 21–23, 24–28 and 29–32.

Sequence 24–28 can be manufactured, for example, by linking, preferably in each case by the activated ester method, the 27th aminoacid (Thr) to the 28th aminoacid (Gly), coupling this 2-unit sequence to the 26th aminoacid (Asn), and bonding the resulting 3-unit sequence to the 25th aminoacid (Thr) and finally to the 24th aminoacid (Gln). The hydroxyl groups of the threonine radicals can, in doing so, be protected by, for example, the tert.-butyl ether group.

The sequence 24–28 with a protected amino group of the glutamine radical and a free carboxyl group of the glycine radical is linked to the sequence 29–32 H-Val-Gly-Ala-Pro-NH$_2$ [Helv. 53, 2135 (1970)], preferably by the carbodiimide-N-hydroxysuccinimide method.

After splitting off the amino protective group of the glutamine radical of the sequence 24–32, the sequence 21–23 Z-Thr(tBu)-Phe-Pro-OH [Helv. 53, 2135 (1970)] is coupled to the sequence 24–32, preferably by the carbodiimide method in the presence of N-hydroxysuccinimide.

The bonding of the sequence 17–20 Z-Asn-Lys(Boc)-Phe-His-NH-HN$_2$ [Helv. 53, 2135 (1970)] to the sequence 21–32 which has been freed from the amino protective group Z is effected, for example, by means of the azide method.

After splitting off the amino protective group Z of the asparagine radical of the sequence 17–32, the requisite fragment 11–32 is completed by coupling the sequence 11–16   Z-Thr(tBu)-Tyr(tBu)-Thr-(tBu)-Gln-Asp(OtBu)Phe-NHNH$_2$ [Helv. 53, 2135 (1970)] to the sequence 17–32, preferably by means of the azide method.

The linking of the sequence 11–32, just described, to the sequence 1–10 Boc-C$\overline{\text{ys}}$-Gly-Asn-Leu-Ser(tBu)-Thr(tBu)-C$\overline{\text{ys}}$-Met-Leu-Gly-OH [Helv. 53, 556 (1970)] is preferably effected by the carbodiimide-N-hydroxysuccinimide method.

The removal of protective groups still present is preferably effected in trifluoroacetic acid or concentrated hydrochloric acid and leads to Asn$^{26}$-Thr$^{27}$-calcitonin-M.

Depending on the procedure used, the new compounds are obtained in the form of bases or of their salts. The bases can be obtained from the salts in a manner which is in itself known. From the bases, salts can be obtained by reaction with acids which are suitable for forming therapeutically usable salts, for example salts with inorganic acids such as hydrogen halide acids, for example hydrochloric acid or hydrobromic acid, perchloric acid, nitric acid or thiocyanic acid, sulphuric acids or phosphoric acids, or with organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicylic acid, 2-phenoxybenzoic acid, 2-acetoxybenzoic acid, methanesulphonic acid, ethanesulphonic acid, hydroxyethanesulphonic acid, benzenesulphonic acid, p-toluenesulphonic acid, naphthalenesulphonic acid or sulphanilic acid.

The peptides obtained in accordance with the process can be used in the form of pharmaceutical preparations. These contain the peptides, mixed with a pharmaceutical, organic or inorganic, excipient suitable, for example, for intravenous, intramuscular, subcutaneous or intranasal administration. The excipient can consist of materials which do not react with the polypeptides, such as, for example, gelatine, agar-agar, tragacanth, cellulose, for example "Avicel" (micro-crystalline cellulose) and cellulose derivatives, such as carboxymethylcellulose or cellulose ethers such as methylcellulose or ethylcellulose, polyalkylene glycols, such as propylene glycols, water, monohydric or polyhydric alcohols such as ethanol, isopropanol, glycerol and hexitol, vegetable oils and other fatty acid esters such as groundnut oil, cottonseed oil, almond oil, olive oil, castor oil, ethyl oleate, isopropyl myristate, isopropyl palmitate, "Cetiol V" (oleic acid esters of liquid fatty alcohols), "Miglyol" or "Labrafac" (mixture of triglycerides of fatty acids with 8–12 carbon atoms), "Labrafil M 2735" or "Labrafac WL 1219" (mixtures of glycerol and polyoxyethylene fatty acid esters), "Arlacel" (sorbitane fatty acid esters), "Tween" (polyoxyethylene sorbitane monooleate), silicone oils such as dimethylsilicone oil or other known medicinal excipients. The pharmaceutical preparations can be, for example, in the form of a lyophilisate or in a liquid form as solutions, suspensions, emulsions or sprays, compare, for example, German Offenlegungsschrift 2,212,315. They are optionally sterilised and/or contain auxiliaries, such as preservatives, stabilisers, wetting agents or emulsifiers. They can also contain yet other therapeutically valuable materials.

The invention is described in the examples which follow.

The following systems are used in the thin layer chromatography:

System 43C: Tert. amyl alcohol-isopropanol-water (51:21:28)

System 45: Sec. butanol-3% strength aqueous ammonia (70:30)

System 52: n-Butanol-glacial acetic acid-water (75:7.5:21)

System 52A: n-Butanol-glacial acetic acid-water (67:10:23)

System 70: Ethyl acetate-pyridine-water (40:20:40), upper phase

System 89: Ethyl acetate-acetone-water (72:24:4)

System 96: Sec.-butanol-glacial acetic acid-water (67:10:23)

System 100: Ethyl acetate-pyridine-glacial acetic acid-water (62:21:6:11)

System 101A: n-Butanol-pyridine-glacial acetic acid-water (42:24:4:30)

System 102A: Ethyl acetate-methyl ethyl ketone-formic acid-water (50:30:10:10)

System 107: Ethyl acetate-pyridine-water (48:24:27)

System 112E: n-Butanol-pyridine-formic acid-water (44:24:2:20)

System 121: Isopropanol-25% strength aqueous ammonia-water (70:10:20)

System 121A: Isopropanol-25% strength aqueous ammonia-water (85:5:10)

$R_f$ data for thin layer chromatography:

DS: On SL 254 ready-prepared silica gel plates of Messrs. Antec, Birsfelden.

DC: On ready-prepared cellulose plates of Messrs. Merck, Darmstadt.

DA: On Alox plates (45 g of $Al_2O_3$ of Messrs. Camag, Muttenz, + 3.5 g of gypsum, thickness 0.3 mm).

The following abbreviations are used in the examples:

Boc tert.-butoxycarbonyl
Z carbobenzoxy
OtBu tert.-butyl ester
ONp p-nitrophenyl ester
OMe methyl ester
OSu hydroxysuccinimide ester
tBu tert.-butyl ether
Bmp β-mercaptopropionyl
DMF dimethylformamide.

EXAMPLE 1

H-Cys-Gly-Asn-Leu-Ser-Thr-Cys-Met-Leu-Gly-Thr-Tyr-Thr-Gln-Asp-Phe-Asn-Lys-Phe-His-Thr-Phe-Pro-Gln-Thr-Asn-Thr-Gly-Val-Gly-Ala-Pro-$NH_2$ (hydrochloride) ($Asn^{26}$-$Thr^{27}$-calcitonin M)

50 mg of Boc-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-$NH_2$ are dissolved in 1.2 ml of highest purity 12 N hydrochloric acid at 0°C (duration approx. 1–2 minutes) and the solution is briefly flushed with $N_2$ and left to stand for 10 minutes at 0°C. It is then cooled with solid carbon dioxide, subjected to a high vacuum and concentrated to a syrup whilst slowly raising the temperature. The syrup is dissolved in 2 ml of water and lyophilised, and the residue is again lyophilised from 2 ml of water and finally equilibrated with the humidity in the atmosphere. The product thus obtained (hydrochloride of $Asn^{26}$-$Thr^{27}$-calcitonin M) is an amorphous, water-soluble powder.

DC: $R_f(45) = 0.45$; $R_f(101A) = 0.53$; $R_f(112E) = 0.39$. In thin layer electrophoresis (on a cellulose plate) at pH 1.9 and 16 volt/cm the compound migrates approx. 3.7 cm towards the cathode in 1½ hours.

The protected dotriacontapeptide-amide is prepared, for example, as follows:

a. Z-Thr(tBu)-Gly-OMe 22.3 g of Z-Thr(tBu)-OSu and 8.29 g of HCl . H-Gly-OMe are dissolved or suspended in 100 ml of dimethylformamide, 7.49 ml of N-methylmorpholine are added and the mixture is stirred for 1 day at 22°C and then concentrated to dryness in a high vacuum. The residue is taken up in ethyl acetate and the solution is washed with citric acid (5% strength), $KHCO_3$ (5% strength) and water, dried over sodium sulphate and concentrated to dryness. The oily residue crystallises on being left to stand overnight at 0°C; melting point 48°C. The dipeptide is chromatographically a single substance and is processed further direct.

DS: $R_f(45) = 0.77$; $R_f$(chloroform-methanol = 9.1) = 0.70 b. H-Thr(tBu)-Gly-OMe . HCl 5.0 g of Z-Thr(tBu)-Gly-OMe are dissolved in 200 ml of methanol and after addition of 13.2 ml of 1 N HCl and 0.5 g of palladium on charcoal (10% Pd) the compound is hydrogenated, with absorption of $CO_2$, until saturated. The catalyst is then filtered off and the filtrate is concentrated to dryness, whereupon a white foam is obtained.

DS: $R_f(45) = 0.64$; $R_f$(chloroform-methanol = 9:1) = 0.41; $R_f(52) = 0.42$.

c. Z-Asn-Thr(tBu)-Gly-OMe 18.9 g of Z-Asn-ONp and 12.5 g of H-Thr(tBu)-Gly-OMe . HCl are dissolved in 95 ml of DMF, 4.6 ml of N-methylmorpholine are added and the mixture is left to stand for 15 hours at room temperature. The solvent is removed in a high vacuum, the residue is powdered by trituration with ethyl acetate, filtered off and crystallised from methanol-chloroform-petroleum ether and from ethanol-water; melting point = 165°C.

DS: $R_f(45) = 0.68$; $R_f$(chloroform-methanol = 9:1) = 0.38, $R_f(52) = 0.70$.

d. H-Asn-Thr(tBu)-Gly-OMe 8.5 g of Z-Asn-Thr(tBu)-Gly-OMe are hydrogenated in 210 ml of methanol in the presence of palladium on charcoal (10% of palladium). The product is an amorphous foam, melting point approx. 60°C.

DS: $R_f(45) = 0.42$; $R_f(52) = 0.27$ e. Z-Thr(tBu)-Asn-Thr(tBu)-Gly-OMe

A solution of 7.51 g of Z-Thr(tBu)-OSu and 5.55 g of H-Asn-Thr(tBu)-Gly-OMe in 50 ml of DMF is left overnight at 22°C and is then concentrated to dryness in a high vacuum. The residue is dissolved in ethyl acetate/n-butanol (1:1), the solution is washed with citric acid (5% strength), $KHCO_3$ (5% strength) and water and evaporated to dryness, and the solid residue is crystallised from methanol-ether; melting point 145°–146°C.

DS: $R_f(45) = 0.73$; $R_f(52) = 0.75$ f. H-Thr(tBu)-Asn-Thr(tBu)-Gly-OMe 2.0 g of Z-Thr(tBu)-Asn-Thr(tBu)-Gly-OMe in 20 ml of methanol are hydrogenated in the usual manner until saturation is reached, an amorphous (foamy) product being obtained.

DS: $R_f(45) = 0.41$; $R_f(52) = 0.34$ g. Z-Gln-Thr(tBu)-Asn-Thr(tBu)-Gly-OMe

A solution of 5.33 g of H-Thr(tBu)-Asn-Thr(tBu)-Gly-OMe and 4.95 g of Z-Gln-ONp in 80 ml of DMF is left to stand overnight at 22°C, the pentapeptide being formed starting to crystallise out even after a short time. Finally, 500 ml of water are added, the mixture is filtered at 0°C and the residue is dried and purified by suspending it in acetone-acetonitrile, 1:1. The crystalline product has a melting point of 220°C.

DS: $R_f(100) = 0.65$; $R_f$(chloroform-methanol 8:2) = 0.35; $R_f(52) = 0.58$ h. Z-Gln-Thr(tBu)-Asn-Thr(tBu)-Gly-OH 6.42 g of pentapeptide methyl ester (from (g)) are dissolved in 58 ml of trifluoroethanol with warming, 25 ml of 1 N sodium hydroxide solution are added at room temperature and the mixture is stirred for 6 hours at 22°C. After addition of 25 ml of 1 N HCl the saponified pentapeptide begins to crystallise out. The mixture is concentrated to 50 ml and the product is filtered off and washed with water until free of chloride.

DS: $R_f(52) = 0.46$; $R_f(100) = 0.29$.

i. Z-Gln-Thr(tBu)-Asn-Thr(tBu)-Gly-Val-Gly-Ala-Pro-NH$_2$ 500 mg of Z-Gln-Thr(tBu)-Asn-Thr(tBu)-Gly-OH, 335 mg of H-Val-Gly-Ala-Pro-NH$_2$ (Helv. 53, 2135 (1970)) and 105 mg of N-hydroxy-succinimide are dissolved in 4 ml of DMF with warming. After addition of 202 mg of dicyclohexyl-carbodiimide, the mixture is stirred for 4 hours at 40°C after which the reaction product is precipitated as a jelly by introduction into a mixture of 100 ml of ether and 100 ml of petroleum ether, and is filtered off. The crude product is purified by twice dissolving it in methanol-water (85:15) and precipitating it with ether, melting point 198°–199°C.

DS: $R_f(96) = 0.41$; $R_f(107) = 0.50$, $R_f$(chloroform-methanol 7:3) = 0.35 j. H-Gln-Thr(tBu)-Asn-Thr(tBu)-Gly-Val-Gly-Ala-Pro-NH$_2$ 3.1 g of the abovementioned Z-derivative are hydrogenated in 120 ml of 80% strength trifluoroethanol using 310 mg of palladium on charcoal (10% of Pd), with absorption of $CO_2$, until saturation is reached. The filtrate is concentrated to approx. 5 ml and after addition of 40 ml of water the mixture is left to stand overnight at 0°C, whereupon the nonapeptide crystallises out in the pure form, melting point approx. 240°C (decomposition).

DS: $R_f(96) = 0.20$; $R_f(107) = 0.32$; $R_f(70) = 0.18$.

k. Z-Thr(tBu)-Phe-Pro-Gln-Thr(tBu)-Asn-Thr(tBu)-Gly-Val-Gly-Ala-Pro-NH$_2$ 517 mg of Z-Thr(tBu)-Phe-Pro-OH (Helv. 53, 2135 (1970)), 410 mg of the abovementioned nonapeptide and 74 mg of N-hydroxy-succinimide are dissolved or suspended in 4 ml of trifluoroethanol-chloroform (6:4), with gentle warming, 177 mg of dicyclohexylcarbodiimide are added at 22°C and the mixture is stirred for 20 hours. The reaction mixture is then concentrated to dryness and the residue is reprecipitated once from chloroform-petroleum ether. The crude product thus obtained is purified in a Craig distribution in the solvent system methanol-buffer-chloroform-carbon tetrachloride, 10:10:3:5:4 (buffer: 28.6 ml of glacial acetic acid + 19.25 mg of ammonium acetate + 960 ml of water) through 420 stages, using phase volumes of 5 ml at a time. Concentrating the contents of distribution elements No. 135–184 ($r_{max} = 160$; K = 0.61) to dryness and subliming away the ammonium acetate in a high vacuum at 45°C gives the pure dodecapeptide as an amorphous powder of melting point approx. 195°C (decomposition).

DS: $R_f(96) = 0.44$; $R_f(70) = 0.51$; $R_f(52A) = 0.38$ l. H-Thr(tBu)-Phe-Pro-Gln-Thr(tBu)-Asn-Thr(tBu)-Gly-Val-Gly-Ala-Pro-NH$_2$ 504 mg of the abovementioned Z-dodecapeptide are dissolved in 30 ml of methanol with warming and are hydrogenated in the usual manner after addition of 100 mg of palladium on charcoal. The product obtained on concentrating the filtrate to dryness is an amorphous, white powder.

DS: $R_f(43C) = 0.25$; $R_f(70) = 0.35$; $R_f(52A) = 0.20$.

m. Z-Asn-Lys(Boc)Phe-His-Thr(tBu)-Phe-Pro-Gln-Thr(tBu)-Asn-Thr(tBu)-Gly-Val-Gly-Ala-Pro-NH$_2$

378 μl of 3.2 N HCl in dioxane and 90 μl of tert.-butyl nitrite are added to a solution of 479 mg of Z-Asn-Lys(Boc)-Phe-His-NHNH$_2$ (Helv. 53, 2135 (1970)) in 4.5 ml of DMF at −20°C. After stirring for 15 minutes at −10°C, 410 mg of H-Thr(tBu)-Phe-Pro-Gln-Thr(tBu)-Asn-Thr(tBu)-Gly-Val-Gly-Ala-Pro-NH$_2$, dissolved in 6 ml of DMF, are added, followed by 260 μl of ethyl-diisopropylamine. The mixture is left to stand overnight at 0°C and the crude product is then precipitated by dropwise addition to 100 ml of ether. It is purified by subjecting it to a Craig distribution in the system methanol-buffer-chloroform-carbon tetrachloride, 10:5:10:5 [buffer as for k] through 200 stages, using phase volumes of 3 ml at a time. The pure hexadecapeptide is obtained as an amorphous powder from distribution elements No. 18–37 ($r_{max} = 27$; K = 0.16) by concentrating to dryness and subliming away the buffer in a high vacuum at 40°C.

DS: $R_f(43C) = 0.40$; $R_f(52) = 0.20$; $R_f(70) = 0.58$.

n. H-Asn-Lys(Boc)-Phe-His-Thr(tBu)-Phe-Pro-Gln-Thr(tBu)-Asn-Thr(tBu)-Gly-Val-Gly-Ala-Pro-NH$_2$, acetate 270 mg of the abovementioned Z-hexadecapeptide in 27 ml of 80% strength acetic acid are hydrogenated for 2 hours with 50 mg of Pd on charcoal, the catalyst is filtered off and the filtrate is concentrated to approx. 3 ml and lyophilised.

DS: $R_f(52) = 0.07$; $R_f(96) = 0.28$; $R_f(107) = 0.65$.

o. Z-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$

117 µl of 3.24 N HCl in dioxane and 21 µl of tert.-butyl nitrite are added to a solution of 165 mg of Z-Thr(tBu)-Tyr(tBu)-Thr(tBu)-Gln-Asp(OtBu)-Phe-NHNH$_2$ (Helv. 53, 2135 (1970)) in 2 ml of DMF at −20°C. The mixture is stirred for 15 minutes at −10°C, a solution, precooled to 0°C, of 198 mg of H-Asn-Lys(Boc)-Phe-His-Thr(tBu)-Phe-Pro-Gln-Thr(tBu)-Asn-Thr(tBu)-Gly-Val-Gly-Ala-Pro-NH$_2$ (acetate) in 4 ml of DMF and 80 µl of ethyl-diisopropylamine are added and the whole is left to stand overnight at 0°C. The crude product is precipitated out by dropwise addition of the reaction solution to a mixture of 40 ml of ether and 20 ml of petroleum ether and is subsequently subjected to a Craig distribution in the system methanol-buffer-chloroform-carbon tetrachloride 20:5:10:10 [buffer as in (k)] through 300 stages, with phase volumes of 3 ml at a time. The chromatographically pure docosapeptide is obtained as an amorphous powder from distribution elements No. 98–117 ($r_{max}$ = 107; K = 0.55) by concentrating to dryness and subliming away the buffer in a high vacuum at 40°C.

DS: $R_f(43C)$ = 0.39; $R_f(52)$ = 0.30; $R_f(96)$ = 0.48.

p. H-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ 260 mg of Z-docosapeptide in 26 ml of 80% strength acetic acid are hydrogenated with 50 mg of Pd on charcoal for 15 hours, the catalyst is filtered off and the filtrate is concentrated to approx. 5 ml and lyophilised. To remove the acetic acid, the residue is twice reprecipitated from methanol-sodium bicarbonate solution.

DS: $R_f(43C)$ = 0.31; $R_f(100)$ = 0.29.

q. Boc-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr-(tBu)-Gly-Val-Gly-Ala-Pro-NH$_2$ 170 mg of the hydrogenated docosapeptide described under (p) and 101 mg of Boc-Cys-Gly-Asn-Leu-Ser(tBu)-Thr(tBu)-Cys-Met-Leu-Gly-OH (Helv. 53, 556 (1970)) are dissolved in 1.2 ml of DMF whilst warming, 15.8 mg of N-hydroxy-succinimide and 21.3 mg of dicyclohexyl-carbodiimide are added and the mixture is stirred under nitrogen for 3½ hours at 45°C. The crude product is then precipitated by dropwise addition of the reaction mixture to 20 ml of peroxide-free ether and is purified by subjecting it to a Craig distribution in the system methanol-buffer-chloroform-carbon tetrachloride (11:3:6:7 [buffer as in (k)] through 450 stages with phase volumes of 3 ml at a time. The pure, protected dotriacontapeptide derivative is isolated from elements No. 190–210 ($r_{max}$ = 200; K = 0.8) as an amorphous powder on concentration, and sublimation of the buffer.

DS: $R_f(70)$ = 0.53; $R_f(100)$ = 0.35; $R_f(52A)$ = 0.29.

EXAMPLE 2

Bmp-Gly-Asn-Leu-Ser-Thr-Cys-Met-Leu-Gly-Thr-Tyr-Thr-Gln-Asp-Phe-Asn-Lys-Phe-His-Thr-Phe-Pro-Gln-Thr-Asn-Thr-Gly-Val-Gly-Ala-Pro-NH$_2$
(hydrochloride) (Desamino-Asn$^{26}$-Thr$^{27}$-calcitonin M)

50 mg of Bmp-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ are converted into the above peptide by acidolysis with 12 N HCl at 0°C, as described in Example 1.

DC: $R_f(45)$ = 0.50; $R_f(101A)$ = 0.59; $R_f(112E)$ = 0.43.

Thin layer electrophoresis: pH 1.9, 16 volt/cm, 1½ hours: Migration distance approx. 2.4 cm towards the cathode.

The protected dotriacontapeptide-amide is prepared, for example, as follows:

61 mg of Bmp-Gly-Asn-Leu-Ser(tBu)-Thr(tBu)-Cys-Met-Leu-Gly-OH (DOS 2,050,434), 113 mg of H-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ (Example 1p) and 10.5 mg of N-hydroxy-succinimide are dissolved in 0.9 ml of DMF. After addition of 14 mg of dicyclohexyl-carbodiimide, the reaction vessel is flushed with N$_2$, closed and stirred for 3½ hours at 45°C. The crude product is precipitated by addition of 15 ml of peroxide-free ether and is purified by means of Craig distribution in the system methanol-buffer-chloroform-carbon tetrachloride 11:3:6:7 [buffer as in Example 1 (k)] through 240 stages, using phase volumes of 3 ml at a time. The pure product is isolated as an amorphous powder from distribution elements No. 108-129 ($r_{max}$ = 118; K = 0.97) by concentration and sublimation of the buffer.

DS: $R_f(52)$ = 0.29; $R_f(70)$ = 0.65; $R_f(100)$ = 0.38.

EXAMPLE 3

Bmp-Gly-Asn-Leu-Ser-Thr-Cys-Val-Leu-Gly-Lys-Leu-Thr-Gln-Asp-Phe-Asn-Lys-Phe-His-Thr-Tyr-Pro-Gln-Thr-Asn-Thr-Gly-Val-Gly-Ala-Pro-NH$_2$
(hydrochloride), =
Desamino-Val$^8$-Lys$^{11}$-Leu$^{12}$-Tyr$^{22}$-Asn$^{26}$-Thr$^{27}$-calcitonin M)

50 mg of Bmp-Gly-Asn-Leu-Ser(tBu)-Thr(tBu)-Cys-Val-Leu-Gly-Lys(Boc)-Leu-Thr(tBu)-Gln-Asp(OtBu)-Phe-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$ are converted into the above peptide by acidolysis with 12 N HCl at 0°C, as described in Example 1.

DC: $R_f(101A)$ = 0.51; $R_f(112E)$ = 0.45.

Thin layer electrophoresis: pH 1.9, 16 volt/cm, 1½ hours: Migration distance approx. 3.7 cm towards the cathode.

The protected dotriacontapeptide-amide can be prepared, for example, as follows:

a. Z-Leu-Thr(tBu)-Gln-Asp(OtBu)-Phe-OMe 4.15 g of H-Thr(tBu)-Gln-Asp(OtBu)-Phe-OMe (Helv. 53, 2135 (1970)) are dissolved in 40 ml of DMF, 3.26 g of Z-Leu-ONp are added and the mixture is left to stand overnight at 22°C. The pentapeptide produced is caused to crystallise out by adding water and is purified by crystallisation from methanol-chloroform-petroleum ether and from methanol-water; melting point 204°C.

DS: $R_f$(chloroform-methanol 9:1) = 0.39; $R_f(89)$ = 0.52.

b. H-Leu-Thr(tBu)-Gln-Asp(OtBu)-Phe-OMe 4.8 g of Z-pentapeptide are hydrogenated in 100 ml of methanol in the usual manner until saturation is reached and the solution which has been freed from catalyst by filtration is concentrated to dryness, whereupon an amorphous, white foam is obtained.

DS: $R_f$(chloroform-methanol (9:1) = 0.14; $R_f$(89) = 0.29.

c. Z-Lys(Boc)-Leu-Thr(tBu)-Gln-Asp(OtBu)-Phe-OMe 4 g of H-Leu-Thr(tBu)-Gln-Asp(OtBu)-Phe-OMe and 3.5 g of Z-Lys(Boc)-ONp are dissolved in 25 ml of DMF and left to stand overnight at 22°C. The resulting hexapeptide is precipitated as a jelly by addition of ether and is purified by crystallisation from methanol-ethyl acetate-petroleum ether; melting point 211°–212°C.

DS: $R_f$(chloroform-methanol 9:1) = 0.50; $R_f$(89) = 0.55.

d. Z-Lys(Boc)-Leu-Thr(tBU)-Gln-Asp(OtBu)-Phe-NHNH$_2$ 5 g of the abovementioned methyl ester are dissolved in 50 ml of DMF with warming, 5 ml of hydrazine hydrate are added and the mixture is left to stand for 5 hours at 22°C. The product is precipitated by addition of 250 ml of water and the finely pulverulent precipitate is filtered off and washed with water until it gives a negative reaction with Folin reagent. Melting point approx. 220°C (decomposition).

DS: $R_f$(chloroform-methanol 9:1) = 0.24; $R_f$(89) = 0.27.

e. Z-Thr(tBu)-Tyr(tBu)-Pro-Gln-Thr(tBu)-Asn-Thr-(tBu)-Gly-Val-Gly-Ala-Pro-NH$_2$ 393 mg of 2-Thr(tBu)-Tyr(tBu)-Pro-OH (DOS 2,050,434) and 66 µl of N-methylmorpholine are dissolved in 5 ml of tetrahydrofurane, the solution is cooled to −20°C and 82 µl of isobutyl chlorocarbonate are added over the course of 1 minute. The mixture is stirred for a further 10 minutes at −15°C, a solution, precooled to 0°C of 300 mg of H-Gln-Thr(tBu)-Asn-Thr(tBu)-Gly-Val-Gly-Ala-Pro-NH$_2$ [analogous to Example 1 (j)] in 6 ml of trifluoroethanol-chloroform (6:4) is added, and the whole is stirred for 1 hour at 0°C and left to stand overnight at 22°C. The reaction mixture is concentrated until a jelly-like mass forms and the latter is reprecipitated from carbon tetrachloride-petroleum ether. The crude product is purified by subjecting it to a Craig distribution in the system methanol-buffer-chloroformcarbon tetrachloride, 10:3:5:4 [buffer as in Example 1(k)] through 400 stages, using phase volumes of 3 ml at a time. The chromatographically pure dodecapeptide is isolated as an amorphous powder from distribution elements No. 118–143 ($r_{max}$ = 130; K = 0.48) by concentration to dryness and sublimation of the buffer in a high vacuum at 40°C.

DS: $R_f$(43C) = 0.42; $R_f$(52A) = 0.37; $R_f$(70) = 0.65 f. H-Thr(tBu)-Tyr(tBu)-Pro-Gln-Thr(tBu)-Asn-Thr-(tBu)-Gly-Val-Gly-Ala-Pro-NH$_2$ 1.56 g of dodecapeptide from (e) are dissolved in 80 ml of methanol with warming, and hydrogenated in the usual manner. On concentrating the hydrogenation solution to dryness, the product is obtained as an amorphous residue of melting point 160°C.

DS: $R_f$(43C) = 0.30; $R_f$(52A) = 0.21; $R_f$(70) = 0.56.

g. Z-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$ 445 mg of Z-Asn-Lys(Boc)-Phe-His-NHNH$_2$ (Helv. 53, 2135 (1970)) are dissolved in 4 ml of DMF with warming and 350 µl of 3.2 N HCl in dioxane and 83 µl of tert.-butyl nitrite are added successively at −20°C. The mixture is stirred for a further 15 minutes at −10°C, a solution of 400 mg of the abovementioned hydrogenated dodecapeptide in 5 ml of DMF, and 192 µl of ethyl-diisopropylamine are then added and the whole is stirred for 2 hours at 0°C. A further 48 µl of ethyl-diisopropylamine are then added and the mixture is left to stand overnight at 0°C. The crude product is precipitated by dropwise addition of the reaction solution to 100 ml of ether and is purified in a Craig distribution in the system methanol-buffer-chloroform-carbon tetrachloride, 10:3:7:4 [buffer as in Example 1 (k)], through 650 stages, using phase volumes of 3 ml at a time. The pure hexadecapeptide is isolated as an amorphous powder in the usual manner from distribution elements No. 230–275 ($r_{max}$ = 255; K = 0.65).

DS: $R_f$(43C) = 0.37; $R_f$(52A) = 0.27; $R_f$(70) = 0.63.

h. H-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$. acetate 250 mg of hexadecapeptide from g) are hydrogenated in the usual manner in 30 ml of 80% strength acetic acid. After filtering off the catalyst, the filtrate is concentrated to approx. 4 ml and lyophilised.

DS: $R_f$(43C) = 0.24; $R_f$(52) = 0.14; $R_f$(96) = 0.34 i. Z-Lys(Boc)-Leu-Thr(tBu)-Gln-Asp(OtBu)-Phe-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$ 274 mg of Z-Lys(Boc)-Leu-Thr(tBu)-Gln-Asp(OtBu)-Phe-NHNH$_2$ are dissolved in 2 ml of DMF with warming and 154 µl of 3.2 N HCl in dioxane and 37 µl of tert.-butyl nitrite are added successively at −20°C. The mixture is stirred for 15 minutes at −10°C, a solution of 275 mg of the above-mentioned hexadecapeptide-acetate in 2 ml of DMF (precooled to 0°C), and 85 µl of ethyl-diisopropylamine are added, and the whole is stirred for 2 hours at 0°C. After adding a further 21 µl of ethyl-diisopropylamine, the mixture is left to stand for 15 hours at 0°C and the crude product is precipitated as a pulverulent precipitate by means of ether-petroleum ether (7:3). It is purified by subjecting it to a Craig distribution in the system methanol-buffer-chloroform-carbon tetrachloride, 10:3:5:5 [buffer as in Example 1 (k)] through 345 stages, using phase volumes of 3 ml at a time. The chromatographically pure docosapeptide is isolated in the usual manner from distribution elements No. 98–132 ($r_{max}$ = 115; K = 0.5).

DS: $R_f$(43C) = 0.39; $R_f$(52) = 0.29; $R_f$(96) = 0.48.

j. H-Lys(Boc)-Leu-Thr(tBu)-Gln-Asp(OtBu)-Phe-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$ 173 mg of docosapeptide from (i) are hydrogenated for 15 hours in 30 ml of 80% strength acetic acid, using 50 mg of Pd on charcoal, and the filtrate is concentrated to approx. 3–4 ml and lyophilised. To remove the acetic acid, the lyophilisate is reprecipitated from trifluoroethanol-sodium bicarbonate solution (5% strength).

DS: $R_f$(52) = 0.21; $R_f$(70) = 0.63; $R_f$(100) = 0.17.

k. Bmp-Gly-Asn-Leu-Ser(tBu)-Thr(tBu)-Cys-Val-Leu-Gly-Lys (Boc)-Leu-Thr(tBu)-Gln-Asp(OtBu)-Phe-Asn-Lys(Boc)-Phe-His-Thr(tBu)-Tyr(tBu)-Pro-Gln-Thr(tBu)-Asn-Thr(tBu)-Gly-Val-Gly-Ala-Pro-NH$_2$ 127 mg of the docosapeptide described under (j), 65 mg of Bmp-Gly-Asn-Leu-Ser(tBu)-Thr(tBu)-Cys-Val-Leu-Gly-OH (DOS 2,050,434), 12 mg of N-hydroxysuccinimide and 17.5 mg of dicyclohexyl-carbodiimide are dissolved or suspended in 0.5 ml of DMF and stirred for 3½ hours at 45°C.

The crude product is precipitated by adding 50 ml of ether and is purified by means of a Craig distribution in the system methanol-buffer-chloroform-carbon tetrachloride, 10:3:5:4 [buffer as in Example 1 (k)] through 250 stages, using phase volumes of 3 ml at a time. The protected dotriacontapeptide, which chromatographically is a single product, is isolated as an amorphous powder in the usual manner from distribution elements No. 88-110 ($r_{max} = 100$; $K = 0.67$).

DS: $R_f(52) = 0.28$; $R_f(70) = 0.65$; $R_f(100) = 0.27$.

EXAMPLE 4

$\overline{\text{Bmp-Gly-Asn-Leu-Ser-Thr-Cys}}$-Met-Leu-Gly-Lys-Leu-Thr-Gln-Asp-Leu-Asn-Lys-Leu-His-Thr-Tyr-Pro-Gln-Thr-Asn-Thr-Gly-Val-Gly-Ala-Pro-NH$_2$, hydrochloride.

(Desamino-Lys$^{11}$-Leu$^{12,16,19}$-Tyr$^{22}$-Tyr$^{22}$-Asn$^{26}$-Thr$^{27}$-calcitonin M).

50 mg of $\overline{\text{Bmp-Gly-Asn-Leu-Ser(tBu)-Thr(tBu)-Cys}}$-Met-Leu-Gly-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ are split, to give the free peptide, by treatment with 12 N HCl at 0°C, as described in Example 1.

DC: $R_f(45) = 0.47$; $R_f(101A) = 0.50$; $R_f(112E) = 0.42$.

Thin layer electrophoresis: pH 1.9, 16 volt/cm, 1½ hours: Migration distance approx. 3.7 cm towards the cathode.

The protected dotriacontapeptide-amide can be prepared, for example, as follows:

a. H-Leu-Thr(tBu)-Gln-Asp(OtBu)-Leu-OMe 3.6 g of Z-Leu-Thr(tBu)-Gln-Asp(OtBu)-Leu-OMe (DOS 2,050,434) in 90 ml of methanol are hydrogenated using 360 mg of Pd on charcoal, with CO$_2$ absorption, until saturation is reached, the catalyst is filtered off and the filtrate is concentrated to dryness.

DS: $R_f$(chloroform-methanol 9:1) = 0.15; $R_f(89) = 0.32$.

b. Z-Lys(Boc)-Leu-Thr(tBu)-Gln-Asp(OtBu)-Leu-OMe 840 mg of H-Leu-Thr(tBu)-Gln-Asp(OtBu)-Leu-OMe are dissolved in 5 ml of DMF, 765 mg of Z-Lys(Boc)-ONp are added and the mixture is left to stand overnight at 22°C. It is then concentrated in a high vacuum to give a syrup and the crude product is precipitated as a jelly by addition of 30 ml of ether. It is purified by reprecipitation from methanol-ethyl acetate-petroleum ether; the pure hexapeptide derivative has a melting point of 218°–220°C.

DS: $R_f$(chloroform-methanol 9:1) = 0.41; $R_f(89) = 0.61$.

c. Z-Lys(Boc)-Leu-Thr(tBu)-Gln-Asp(OtBu)-Leu-NHNH$_2$ 720 mg of the hexapeptide methyl ester described under (b) are dissolved in 40 ml of absolute methanol and after adding 3.6 ml of hydrazine hydrate the mixture is left to stand for 5 hours at 22°C. The resulting hexapeptide-hydrazide is precipitated by adding 75 ml of water, filtered off, well washed with water and dried; melting point 215°–218°C.

DS: $R_f$(chloroform-methanol 8:2) = 0.55; $R_f(89) = 0.29$.

d. Z-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ 636 mg of Z-Asn-Lys(Boc)-Leu-His-NHNH$_2$(DOS 2,050,434) are dissolved in 10 ml of DMF with warming, the solution is cooled to −20°C and 525 µl of 3.2 N HCl in dioxane and 119 µl of tert.-butyl nitrite are added successively. The mixture is stirred for 15 minutes at −15°C and a solution, precooled to 0°C, of 600 mg of H-Thr(tBu)-Tyr(tBu)-Pro-Gln-Thr(tBu)-Asn-Thr(tBu)-Gly-Val-Gly-Ala-Pro-NH$_2$ [Example 3 (f)] in 4.5 ml of DMF, and 230 µl of N-methylmorpholine, are then added. The mixture is stirred for 2 hours at 0°C, a further 46 µl of N-methylmorpholine are added and the whole is left to stand overnight at 0°C. The crude product is precipitated with 100 ml of ether and subjected to a Craig distribution in the system acetonitrile-buffer-chloroform-methanol, 1:1:1:1 [buffer as in Example 1 (k)] through 500 stages, using phase volumes of 3 ml at a time. The pure hexadecapeptide is obtained as an amorphous powder from distribution elements No. 38–62 ($r_{max} = 50$; $K = 0.11$) by concentration to dryness and sublimation of the buffer at 40°C in a high vacuum.

DS: $R_f(43C) = 0.38$; $R_f(52A) = 0.28$; $R_f(70) = 0.51$.

e. H-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$. acetate 380 mg of hexadecapeptide from (d), in 45 ml of 80% strength acetic acid are hydrogenated using 50 mg of Pd on charcoal until the starting product has disappeared (as checked by thin layer chromatography). After filtering off the catalyst, the filtrate is concentrated to approx. 4 ml and lyophilised.

DS: $R_f(43C) = 0.29$; $R_f(70) = 0.40$.

f. Z-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ 230 mg of Z-Lys(Boc)-Leu-Thr(tBu)-Gln-Asp(OtBu)-Leu-NHNH$_2$ are dissolved in 2 ml of DMF and 134 µl of 2.3 N HCl in dioxane and 32 µl of tert.-butyl nitrite are added successively at −20°C. The solution is stirred for 15 minutes at −10°C, after which a solution of 306 mg of the hexadecapeptide-acetate described under (e) in 3 ml of DMF and 63 µl of N-methylmorpholine are added. The mixture is stirred for 2 hours at 0°C, a further 15 µl of N-methylmorpholine are added, the whole is left to stand overnight at 0°C and the crude product is precipitated by adding 60 ml of ether and 30 ml of petroleum ether. It is purified by subjecting it to a Craig distribution through 240 stages in the system methanol-buffer-chloroform-carbon tetrachloride, 10:3:5:5 [buffer as in Example 1(k)]. The pure docosapeptide is isolated as an amorphous powder in the usual manner from distribution elements No. 83–107 ($r_{max} = 95$; $K = 0.65$).

DS: $R_f(52) = 0.27$; $R_f(70) = 0.59$; $R_f(100) = 0.41$.

g. H-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ 100 mg of docosapeptide from f) in 16 ml of 80% strength acetic acid are hydrogenated overnight with 15 mg of Pd on charcoal, the catalyst is filtered off and the filtrate is concentrated to approx. 2 ml and lyophilised. To remove the acetic acid, the residue is dissolved in 0.6 ml of trifluoroethanol and reprecipitated by dropwise addition to 5 ml of sodium bicarbonate solution (5% strength).

DS: R$_f$(52) = 0.18; R$_f$(70) = 0.50; R$_f$(100) = 0.20.

h. Bmp-Gly-Asn-Leu-Ser(tBu)-Thr(tBu)-Cys-Met-Leu-Gly-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ 43 mg of Bmp-Gly-Asn-Leu-Ser(tBu)-Thr(tBu)-Cys-Met-Leu-Gly-OH (DOS 2,050,454), 80 mg of the abovementioned hydrogenated docosapeptide, 7.5 mg of N-hydroxysuccinimide and 10 mg of dicyclohexylcarbodiimide are dissolved in 0.6 ml of DMF and the mixture is stirred for 3½ hours at 45°C in a N$_2$ atmosphere. The crude product is then precipitated by addition of 15 ml of ether and is purified by Craig distribution in the system methanol-buffer-chloroform-carbon tetrachloride, 11:3:6:7 [buffer as in Example 1(k)] through 200 stages, using phase volumes of 3 ml at a time. The pure substance is isolated as an amorphous powder in the usual manner from distribution elements No. 90–115 ($r_{max}$ = 100; K = 1.0).

DS: R$_f$(52) = 0.27; R$_f$(70) = 0.66; R$_f$(100) = 0.31.

EXAMPLE 5

50 mg of Boc-Cys-Gly-Asn-Leu-Ser(tBu)-Thr(tBu)-Cys-Met-Leu-Gly-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ are split to give the free peptide by treatment with 12 N HCl at 0°C, as described in Example 1.

DC: R$_f$(45) = 0.43; R$_f$(101A) = 0.43; R$_f$(112E) =0.38.

Thin layer electrophoresis: pH 1.9; 16 volt/cm, 1½ hours, migration distance approx. 4.9 cm towards the cathode.

The protected dotriacontapeptide-amide can be prepared as follows: 110 mg of Boc-Cys-Gly-Asn-Leu-Ser-(tBu)-Thr(tBu)-Cys-Met-Leu-Gly-OH (Helv. 53, 556 (1970)), 185 mg of H-Lys(Boc)-Leu-Thr(tBu)-Gln-Asp(OtBu)-Leu-Asn-Lys(Boc)-Leu-His-Thr(tBu)-Tyr(tBu)-Pro-Gln-Thr(tBu)-Asn-Thr(tBu)-Gly-Val-Gly-Ala-Pro-NH$_2$ [Example 4 g)] and 17.2 mg of N-hydroxysuccinimide are dissolved in 1.5 ml of DMF with warming, 23 mg of dicyclohexylcarbodiimide are added and the mixture is stirred for 3½ hours at 45°C under N$_2$. The crude product is then precipitated by adding 30 ml of peroxide-free ether and is purified in a Craig distribution through 350 stages in the system methanol-buffer-chloroform-carbon tetrachloride, 11:3:6:7 [buffer as in Example 1 (k)]. The chromatographically pure protected dotriacontapeptide is isolated from distribution elements No. 140–179 ($r_{max}$ = 159; K = 0.83) by concentration to dryness and sublimation of the buffer in a high vacuum at 45°C.

DS: Rf(52A) = 0.28; Rf(70) = 0.54; Rf(100) = 0.29.

EXAMPLE 6

202 mg of BOC-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-lys(Boc)-Phe-His-Thr(tBu)-Phe-Pro-Gln-Thr(tBu)-Ala-Thr(tBu)-Gly-Val-Gly-Ala-Pro-NH$_2$ are dissolved in 6 ml of 90% strength trifluoroacetic acid and the solution is degassed with nitrogen and left to stand for 90 minutes at 23°C. It is then poured into 50 ml of ice-cold peroxide-free ether and the precipitate is filtered off, rinsed with ether and dried in vacuo at 40°C. 185 mg of Thr$^{27}$-calcitonin M are obtained as the trifluoroacetate. This is converted into the acetate by elution using a column of Merck ion exchanger No. II (weakly basic, acetate form); the yield is 158 mg of lyophilised acetate.

For purification, 80 mg of the acetate are dissolved in 5 ml of water and a total of 1.2 ml of Merck ion exchanger No. II (weakly basic, free base form) is added whilst stirring, whereupon the pH assumes a value of approx. 6.5 and a fine precipitate separates out. To complete the precipitation, the mixture is stirred for 2 hours, during which the pH of the solution rises to 7.1.

The precipitate and ion exchanger are then filtered off together and thoroughly rinsed with water, and the peptide which has precipitated is eluted from the ion exchanger by addition of warm 90% strength acetic acid. The ion exchanger is filtered off and rinsed with 90% strength acetic acid, and the acetic acid solution is lyophilised. This gives 74 mg of Thr$^{27}$-calcitonin M as the acetic acid salt, which according to thin layer chromatography and electrophoresis displays a high degree of purity.

DA: Rf(52) = 0.49 (calcitonin M: Rf(52) = 0.55); DC: Rf(101A) = 0.52 (calcitonin M: Rf(101A) = 0.57).

In thin layer electrophoresis (cellulose plates, pH 1.9, 2 hours, 280 V) the migration distance is 4.5 cm towards the cathode (calcitonin M: Migration distance 4.5 cm).

In aminoacid analysis after total hydrolysis (6 N HCl, 110°C, 24 hours), the product shows the calculated aminoacid ratio).

The starting material can be prepared as follows:

a. Z-Ala-Thr(tBu)-Gly-OMe

A mixture of 18.9 g of Z-Ala-ONp, 13.4 g of H-Thr(tBu)-Gly-OMe. HCl, 100 ml of DMF and 6.2 ml of N-methylmorpholine is stirred for 17 hours at room temperature, the solvent is removed in a high vacuum, the residue is taken up in ethyl acetate, the solution is washed and dried as described in Example 1 under a), and evaporated, and the residue is crystallised from ether-petroleum ether. Melting point 104°–106°C; 16 g.

b. H-Ala-Thr(tBu)-Gly-OMe 13.3 g of the product obtained under (a) are hydrogenated in methanol in the presence of 1.5 g of palladium on charcoal (10% of Pd). 9.4 g of colourless resin are obtained.

c. Z-Thr(tBu)-Ala-Thr(tBu)-Gly-OMe 9.4 g of the product obtained under b) and 13.2 g of Z-Thr(tBu)-OSu are dissolved in 100 ml of DMF and the solution is left to stand for 17 hours at room temperature. The product is then precipitated by pouring the solution into 500 ml of ice water, and is filtered off, dried and crystallised from acetone-petroleum ether, with addition of a little water. Melting point 193° – 195°C; 13.6 g.

d. H-Thr(tBu)-Ala-Thr(tBu)-Gly-Ome 13.1 g of the product from (c), in 750 ml of methanol, are hydrogenated using 2.6 g of palladium on charcoal. 9.95 g of colourless oil are obtained.

e. Z-Gln-Thr(tBu)-Ala-Thr(tBu)-Gly-OMe

This compound is prepared analogously to the pentapeptide derivative described in Example 1 under g). It crystallises from methanol. Melting point 198°–202°C; 10.7 g.

f. H-Gln-Thr(tBu)-Ala-Thr(tBu)-Gly-OMe 10 g of the product from (e), in 1 liter of methanol, are hydrogenated using 2 g of palladium on charcoal. The product (8.2 g) is immediately processed further.

g. Z-Thr(tBu)-Phe-Pro-Gln-Thr(tBu)-Ala-Thr(tBu)-Gly-OMe 8.2 g of the product from f) are mixed with 8.3 g of Z-Thr(tBu)-Phe-Pro-OH (Helv. Chim. Acta 53, 2135 (1970)), 100 ml of DMF, 4.0 g of N-hydroxysuccinimide and 4.2 g of dicyclohexylcarbodiimide are added and the mixture is stirred for 17 hours at room temperature. The dicyclohexylurea is then filtered off, the filtrate is poured into 1.3 l of ice water and after 2 hours the precipitate is filtered off, dried and stirred with 120 ml of ethyl acetate. The insoluble powder is filtered off, washed with ethyl acetate and dried. 8.5 g of a product having the following Rf values are obtained: DS: Rf (121A) = 0.78; Rf(102A) = 0.85; Rf(43C) = 0.71.

h. Z-Thr(tBu)-Phe-Pro-Gln-Thr(tBu)-Ala-Thr(tBu)-Gly-OH 5.15 g of the product from g) are dissolved in 110 ml of 90% strength methanol with warming, the solution is cooled to 23°C and 13.5 ml of 1.0 N aqueous sodium hydroxide solution are added. After 10 minutes, 45 ml of water are added, followed by a further 25 ml after a further 5 minutes. After 20 minutes, the solution is poured into 270 ml of ice-cold 0.05 N aqueous hydrochloric acid, and the precipitate is filtered off, washed with ice water and with water-acetonitrile (4:1) and dried. In the DS, the product shows the following values: Rf(45) = 0.27; Rf(100) = 0.33; Rf(43C) = 0.28; 4.1 g.

i. H-Thr(tBu)-Phe-Pro-Gln-Thr(tBu)-Ala-Thr(tBu)-Gly-OH 3.65 g of the product from h) are suspended in 125 ml of DMF and hydrogenated in the presence of 0.5 g of palladium on charcoal (10% of Pd). The product (2.62 g) is triturated with water, filtered off and dried.

DS: Rf(100) = 0.12; Rf(52) = 0.23.

j. Z-Asn-Lys(Boc)-Phe-His-Thr(tBu)-Phe-Pro-Gln-Thr(tBu)-Ala-Thr(tBu)-Gly-OH 7.2 g. of Z-Asn-Lys(Boc)-Phe-His-NH-NH₂ (Helv. Chim. Acta 53, 2135 (1970)) are dissolved in 30 ml of DMF whilst warming to 80°C, the solution is cooled to −30°C and 7.74 ml of 3.7 N hydrogen chloride in dioxane are added. 1.42 ml of tert.-butyl nitrite are then added at −30°C, the mixture is allowed to react for 10 minutes at −10°C and is again cooled to −30°C, and a solution of 6.45 g of H-Thr(tBu)-Phe-Pro-Gln-Thr(tBu)-Ala-Thr(tBu)-Gly-OH and 7.8 ml of N-ethyldiisopropylamine in 70 ml of DMF is then added dropwise. The solution is left to stand for 18 hours at 0°C and is then poured into 400 ml of ice-cold 1% strength acetic acid. The precipitate is filtered off, washed with water and dried in vacuo over calcium chloride. The product is digested with acetonitrile, filtered off and dried.

DS: Rf(70) = 0.33; Rf(100) = 0.21.

k. Z-Asn-Lys(Boc)-Phe-His-Thr(tBu)-Phe-Pro-Gln-Thr(tBu)-Ala-Thr(tBu)-Gly-Val-Gly-Ala-Pro-NH₂

1.11g of dicyclohexylcarbodiimide are added to a mixture of 7.5 g of Z-Asn-Lys(Boc)-Phe-His-Thr(tBu)-Phe-Pro-Gln-Thr(tBu)-Ala-Thr(tBu)-Gly-OH, 0.99 g of N-hydroxysuccinimide, 1.84 g of H-Val-Gly-Ala-Pro-NH₂ (Helv. Chim. Acta, loc. cit.) and 70 ml of DMF and the whole is stirred for 5 hours at 45°C. The mixture is then poured into 1.2 liters of ice-cold ether and the precipitate is filtered off and dried. The crude product is stirred with twice 200 ml of acetonitrile-methanol (9:1), filtered off and dried.

DS: Rf(45) = 0.50; Rf(96) = 0.46; Rf(100) = 0.29; Rf(121) = 0.80; yield 8.5 g.

l. H-Asn-Lys(Boc)-Phe-His-Thr(tBu)-Phe-Pro-Gln-Thr(tBu)-Ala-Thr(tBu)-Gly-Val-Gly-Ala-Pro-NH₂. acetate.

7.05 g of the product described under (k) are hydrogenated in 400 ml of 80% strength acetic acid in the presence of 1 g of palladium on charcoal (10% of Pd). The product (6.6 g) shows the following values in DS: Rf (96) = 0.35; Rf (121) = 0.72; Rf (45) = 0.27.

m. Z-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH₂.

565 mg of Z-Thr(tBu)-Tyr(tBu)-Thr(tBu)-Gln-Asp(OtBu)-Phe-NH-NH₂ (Helv. Chim. Acta, loc. cit.) are dissolved in 4 ml of DMF whilst warming to 80°C, the solution is cooled to −20°C, 0.35 ml of 3.7 N hydrogen chloride in dioxane and 0.067 ml of tert.-butyl nitrite are added, the mixture is stirred for 10 minutes at −15°C and a solution, cooled to 0°C, of 600 mg of H-Asn-Lys(Boc)-Phe-His-Thr(tBu)-Phe-Pro-Gln-Thr(tBu)-Ala-Thr(tBu)-Gly-Val-Gly-Ala-Pro-NH₂-acetate in 5 ml of DMF and 0.33 ml of N-ethyldiisopropylamine is introduced dropwise. The whole is stirred for 5 minutes at −15°C and then allowed to warm to 23°C and stirred for 6 hours. It is then poured into 100 ml of ice water and the precipitate is filtered off, washed with water and dried in vacuo over calcium chloride. It is purified by reprecipitating from methanol-water and triturating the precipitated product, after drying, with acetone. 650 mg of product are obtained.

DS: Rf(43C) = 0.33; Rf (70) = 0.60.

n. H-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH₂

610 mg of the product obtained under (m) are hydrogenated in 25 ml of 80% strength acetic acid in the presence of palladium on charcoal. The product is dissolved in 50 ml of n-butanol saturated with water and to remove acetic acid the solution is washed twice with dilute sodium carbonate solution, then twice with half-saturated sodium chloride solution and finally with water. The butanol phase is then evaporated and 605 mg of the product are obtained as a colourless foam.

DS: Rf (100) = 0.20; Rf (96) = 0.40.

o. Boc-C̅y̅s̅-Gly-Asn-Leu-Ser(tBu)-Thr(tBu)-C̅y̅s̅-Met-Leu-Gly-Thr(tBu)-Tyr-tBu)-Thr(tBu)-Gln-Aso(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH₂

75 mg of dicyclohexylcarbodiimide are added to a mixture of 605 mg of H-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH₂, 290 mg of the decapeptide Boc-C̅y̅s̅-Gly-Asn-Leu-Ser(tBu)-Thr(tBu)-C̅y̅s̅-Met-Leu-Gly-OH (Helv. Chim. Acta 53, 556 (1970)), 46 mg of 1-hydroxybenzotriazole and 10 ml of DMF, the mixture is stirred for 90 minutes at 40°C and 18 hours at 23°C, the dicyclohexylurea which has separated out is filtered off and the filtrate is poured into 100 ml of ice-cold peroxide-free ether. The precipitate is filtered off, rinsed with ether and dried. The resulting crude product is subjected to preliminary purification by reprecipitating twice from DMF-ether and twice from DMF-water. The precipitated product is subjected to a counter-current distribution through 300 stages (solvent system 3.66 liters of methanol, 1 liter of buffer, 2 liters of chloroform and 2.32 liters of carbon tetrachloride; buffer: 29 ml of glacial acetic acid and 19 g of ammonium acetate in 1 liter of water). The pure substance is present in fractions 123–137, distribution index K = 0.76.

DS: Rf(100) = 0.32; Rf(52A) = 0.41.

EXAMPLE 7

H-C$\overline{\text{ys-Gly-Asn-Leu-Ser-Thr-Cys}}$-Met-Leu-Gly-Thr-Leu-Thr-Gln-Asp-Phe-Asn-Lys-Phe-His-Thr-Phe-Pro-Gln-Thr-Ala-Thr-Gly-Val-Gly-Ala-Pro-NH$_2$. acetate (leu$^{12}$-Thr$^{27}$-calcitonin M)

490 mg of Boc-C$\overline{\text{ys-Gly-Asn-Leu-Ser(tBu)-}}$Thr(tBu)-C$\overline{\text{ys}}$-Met-Leu-Gly-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH$_2$ are introduced into 12 ml of ice-cold 90% strength trifluoroacetic acid and the solution is degassed with nitrogen and warmed to room temperature. The solution is left to stand for 90 minutes at room temperature and is then again cooled to 0°C and poured into 150 ml of ice-cold peroxide-free ether, the mixture is left to stand for 2 hours at 0°C and the fine precipitate is filtered off, washed with ether and dried. It is then dissolved in 15 ml of 5% strength acetic acid and the solution is filtered through a column of Merck ion exchanger No. II, weakly basic, acetate form, to remove the trifluoroacetic acid. The column is rinsed with 3 times 10 ml of 5% strength acetic acid and the eluates are combined and lyophilised. 432 mg of Leu$^{12}$-Thr$^{27}$-calcitonin M-acetate are obtained as a colourless, light powder.

DC: Rf(101A) = 0.50;
DA: Rf(52) = 0.45.

In thin layer electrophoresis on cellulose plates (pH = 1.9, 280 V, 2 hours) the migration distance is 4.5 cm towards the cathode.

The starting material can be prepared as follows:

a. Z-Thr(tBu)-Leu-Thr(tBu)-Gln-Asp(OtBu)-Phe-NH-NH$_2$ 12.7 g of H-Leu-Thr(tBu)-Gln-Asp(OtBu)-Phe-OMe are dissolved in 100 ml of DMF, 9.0 g of Z-Thr(tBu)-OSu are added and the mixture is left to stand for 17 hours at 25°C. The product is then precipitated with water, filtered off, dried and crystallised from ethyl acetate, yield 14.2 g; for further purification, the product is reprecipitated from methanol-water, melting point 197°–199°C. For conversion into the hydrazide, 13.9 g of the Z-Thr(tBu)-Leu-Thr(tBu)-Gln-Asp(OtBu)-Phe-OMe obtained are dissolved in 700 ml of methanol, 70 ml of hydrazine hydrate are added and the mixture is left to stand for 45 minutes at room temperature. It is then concentrated in vacuo to a volume of 300 ml and the product is precipitated by adding 500 ml of water. It is filtered off, washed with water until neutral and dried. This gives 13.5 g of crude hydrazide. The latter is purified by one reprecipitation from DMF-water, and crystallisation from methanol. 11 g of crystalline product, melting point 225°–227°C, are obtained.

b. Z-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH$_2$

A suspension of 4.00 g of Z-Thr(tBu)-Leu-Thr(tBu)-Gln-Asp(OtBu)-Phe-NHNH$_2$ and 25 ml of DMF is warmed to 70°C, whilst stirring, until all has dissolved, the solution is cooled to −20°C and 2.50 ml of 3.70 N hydrogen chloride in dioxane are added. 0.48 ml of tert.-butyl nitrite is then added dropwise whilst stirring and cooling to −20°C, and the mixture is allowed to rise to −10°C and stirred at this temperature for a further 15 minutes. A solution, pre-cooled to −10°C, of 4.2 g of H-Asn-Lys(Boc)-Phe-His-Thr(tBu)-Phe-Pro-Gln-Thr(tBu)-Ala-Thr(tBu)-Gly-Val-Gly-Ala-Pro-NH$_2$. acetate in 50 ml of DMF and 1.6 ml of N-ethyl-diisopropylamine are then added and the mixture is allowed to rise to 0°C and stirred for a further 60 minutes, whilst slowly adding dropwise a further 0.8 ml of N-ethyl-diisopropylamine. The mixture is allowed to react for 17 hours at 23°C, whereupon a jelly-like precipitate forms. 500 ml of ice-cold peroxide-free ether are now added and the precipitate is filtered off, rinsed with ether and dried. The product is triturated with 200 ml of ice-water, again filtered off, dried and reprecipitated three times from DMF-water and twice from DMF-ethyl acetate. 4.98 g of product are thus obtained.

DS: Rf(70) = 0.61; Rf(100) = 0.38.

c. H-Thr(tBu)-Leu-Thr(tBu)-Gln-Asp(OtBu)-Phe-Asp-Lys(Boc)-Phe-His-Thr(tBu)-Phe-Pro-Gln-Thr(tBu)-Ala-Thr(tBu)-Gly-Val-Gly-Ala-Pro-NH$_2$ 3.0 g of the product obtained under (b) are dissolved in 200 ml of 90% strength acetic acid and hydrogenated in the usual manner in the presence of 0.5 g of palladium on charcoal (10% Pd). To remove the acetic acid, the resulting acetic acid salt is dissolved in 200 ml of n-butanol saturated with water and the solution is repeatedly washed with dilute sodium carbonate solution, dilute sodium chloride solution and finally water. The strong emulsions which are formed on washing the butanol solution are separated off by centrifuging. The butanol solution is then evaporated to dryness and 2.15 g of H-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH$_2$ are obtained as a colourless resin.

DS: Rf(96) = 0.37; Rf(100) = 0.19.

d. Boc-C$\overline{\text{ys-Gly-Asn-Leu-Ser(tBu)-Thr(tBu)-Cys}}$-Met-Leu-Gly-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Ala-Thr(tBu)-Gly-Val-Gly-Ala-Pro-NH$_2$ 400 mg of dicyclohexylcarbodiimide are added to a mixture of 2.01 g of the product obtained under (c), 1.00 g of Boc-C$\overline{\text{ys-Gly-Asn-Leu-Ser(tBu)-Thr(tBu)-}}$C$\overline{\text{ys}}$-Met-Leu-Gly-OH, 250 mg of N-hydroxysuccinimide and 30 ml of DMF, whilst stirring, and the mixture is then stirred for 6 hours at 43°C. Thereafter, it is cooled to 0°C for 3 hours, the dicyclohexylurea which has separated out is filtered off and the filtrate is poured into 250 ml of ice-cold peroxide-free ether. The precipitate is filtered off, rinsed with ether and dried. The product is purified by reprecipitating it three times from DMF-water and subsequently three times from DMF-acetone. This gives 1.72 g of purified, protected Leu$^{12}$-Thr$^{27}$-calcitonin M.

DS: Rf(52A) = 0.33; Rf(100) = 0.30; Rf(107) = 0.58.

EXAMPLE 8

H-Cys-Gly-Asn-Leu-Ser-Thr-Cys-Met-Leu-Gly-Thr-
Leu-Thr-Gln-Asp-Phe-Asn-Lys-Phe-His-Thr-Phe-Pro-
Gln-Thr-Asn-Thr-Gly-Val-Gly-Ala-Pro-NH$_2$
(Leu$^{12}$-Asn$^{26}$-Thr$^{27}$-calcitonin M).

170 mg of Boc-Cys-Gly-Asn-Leu-Ser(tBu)-Thr-(tBu)-Cys-Met-Leu-Gly-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ are dissolved in 5 ml of 90% strength trifluoroacetic acid, the solution is left to stand for 90 minutes at 25°C and the peptide-trifluoroacetate is precipitated with peroxide-free ether, filtered off, rinsed with ether, dried and dissolved in 1% strength acetic acid. It is then filtered through a column of Merck ion exchanger (weakly basic, acetate form) and eluted with 1% strength acetic acid, and the eluate is lyophilised (116 mg). The resulting acetate is purified by dissolving it in 5 ml of water (pH of the solution = 4.2) and adding a total of 2.8 ml of Merck ion exchanger No. II (weakly basic, base form) in portions, whilst stirring. In the course thereof, the pH of the solution slowly rises and when it reaches a value of approx. 6.7 the free peptide begins to precipitate. The mixture is stirred for a total of 2 hours, during which a pH value of 7.1 is reached. The precipitate and the ion exchanger are then filtered off together and rinsed with water, and the peptide is then dissolved out of the ion exchanger by stirring with 90% strength acetic acid which has been warmed to 60°C. The mixture is filtered, the residue is rinsed with 90% strength acetic acid and the filtrate is lyophilised. 98 mg of Leu$^{12}$-Asn$^{26}$-Thr$^{27}$-calcitonin M are obtained as the acetate, in high purity. DC: Rf(101A) = 0.33; DA: Rf(52) = 0.47. The process of purification according to the invention, described here, entailing precipitation of the peptide in the isoelectric range, forms the subject of Swiss Application Case 4–9157.

The protected peptide used as the starting material can be prepared as follows:

a. Z-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ 380 mg of Z-Thr(tBu)-Leu-Thr(tBu)-Gln-Asp(OtBu)-Phe-NHNH$_2$ (compare Example 7) are dissolved in 5 ml of DMF whilst stirring and warming to 70°C, the solution is cooled to −20°C, 0.265 ml of 3.71 N hydrogen chloride in dioxane is added followed by 0.051 ml of tert.-butyl nitrite, and the reaction is allowed to take place for 10 minutes at −10°C. A solution, cooled to −10°C, of H-Asn-Lys(Boc)-Phe-His-Thr(tBu)-Phe-Pro-Gln-Thr(tBu)-Asn-Thr(tBu)-Gly-Val-Gly-Ala-Pro-NH$_2$. acetate (compare Example 1, sub. n) in 5 ml of DMF and 0.20 ml of N-ethyldiisopropylamine is then added and the mixture is stirred for 1 hour at 0°C. During this time, a further 0.07 ml of N-ethyl-diisopropylamine is added and the mixture is then allowed to warm to room temperature and left to stand for 1 hour at 25°C and 20 hours at 5°C, whereupon a jelly-like precipitate forms. Precipitation is then effected by adding 100 ml of ice water and the precipitate is filtered off after 1 hour at 0°C, rinsed with water and dried. The powder is triturated with ether, filtered off and again dried. The crude product (colourless powder) is purified by one reprecipitation from DMF-water and from DMF-acetone. 440 mg of product are obtained.

DS: Rf(70) = 0.52; Rf(100) = 0.31; Rf(96) = 0.40.

b. H-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ 260 mg of the product obtained under a) are dissolved in 25 ml of 80% strength acetic acid and are hydrogenated in the usual manner in the presence of 50 mg of palladium on charcoal (10% of Pd). The product (266 mg of resin) is dissolved in 20 ml of water-saturated n-butanol, in order to remove acetic acid. The solution is washed repeatedly with sodium carbonate solution, dilute sodium chloride solution and water, and the butanol phase is then evaporated. Yield: 199 mg.

DS: Rf(100) = 0.13; Rf(96) = 0.36.

c. Boc-Cys-Gly-Asn-Leu-Ser(tBu)-Thr(tBu)-Cys-Met-Leu-Gly-Thr(tBu)-Leu-Thr(tBu)-Gln-Asp(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$ 27 mg of dicyclohexylcarbodiimide are added to a mixture of 102 mg of Boc-Cys-Gly-Asn-Leu-Ser(tBu)-Thr(tBu)-Cys-Met-Leu-Gly-OH, 199 mg of H-Thr(tBu)-Leu-Thr(tBu)-Gln-Asp-(OtBu)-Phe-Asn-Lys(Boc)-Phe-His-Thr(tBu)-Phe-Pro-Gln-Thr(tBu)-Asn-Thr(tBu)-Gly-Val-Gly-Ala-Pro-NH$_2$, 16 mg of N-hydroxysuccinimide and 3 ml of DMF whilst stirring, the mixture is stirred for 6 hours at 45°C and poured into ice-cold ether, and after 2 hours at 0°C the precipitate is filtered off. It is rinsed with ether and dried, the powder is dissolved in 5 ml of DMF whilst warming, the solution is cooled to room temperature and the product is precipitated by adding 50 ml of ethyl acetate. It is filtered off, rinsed with ethyl acetate and dried, the powder is then dissolved in 10 ml of DMF-methanol (1:1) whilst warming, the solution is cooled in ice and the product is precipitated by addition to ice water. After 17 hours at 0°C, the fine precipitate is filtered off, rinsed with water and dried in vacuo over calcium chloride. 175 mg of the protected dotriacontapeptide mentioned in the title are obtained.

DS: Rf(107) = 0.60; Rf(52A) = 0.23; Rf(100) = 0.22.

EXAMPLE 9

H-Cys-Gly-Asn-Leu-Ser-Thr-Cys-Met-Leu-Gly-Thr-
Tyr-Thr-Gln-Asp-Phe-Asn-Lys-Phe-His-Thr-Phe-Pro-
Gln-Thr-Asn-Ile-Gly-Val-Gly-Ala-Pro-NH$_2$
(Asn$^{26}$-calcitonin M).

115 mg of finely powdered BOC-Cys-Gly-Asn-Leu-Ser(tBu)-Thr(tBu)-Cys-Met-Leu-Gly-Thr(tBu)-Tyn(tBu)-Thr(tBu)-Gln-Asp(OtBu)-Phe-Asn-Lys(boc)-Phe-His-Thr(tBu)-Phe-Pro-Gln-Thr(tBu)-Asn-Ile-Gly-Val-Gly-Ala-Pro-NH$_2$ are added to 2.5 ml of ice-cold 90% strength trifluoroacetic acid whilst stirring and degassing with nitrogen. After the peptide has dissolved, the solution is allowed to rise to 21°C and is left to stand for 90 minutes. It is then poured into 50 ml of ice-cold peroxide-free ether and the product is filtered off and dried. 84 mg of the trifluroacetic acid salt of Asn$^{26}$-calcitonin M are obtained. To convert this into the acetate, it is dissolved in 1% strength acetic acid and filtered through an ion exchange column of Merck ion exchanger No. II (weakly basic, acetate form). The eluate is lyophilised and 75 mg of Asn$^{26}$calcitonin M are obtained as the acetate. After total hydrolysis (6 N HCl, 24 hours at 110°C), the product shows the expected aminoacid ratio.

In thin layer chromatography on cellulose plates, the product shows the following Rf values (the comparative values for calcitonin M are shown in brackets): Rf(101A) = 0.55 (0.60); Rf(112A) = 0.58 (0.62).

The protected peptide used as the starting material can be prepared as follows:

a. Z-Asn-Ile-Gly-OMe

A mixture of 9.1 g of H-Ile-Gly-OMe.HCl, 16.3 g of Z-Asn-ONp, 50 ml of DMF and 4.1 ml of N-ethylmorpholine is left to stand for 18 hours at room temperature. Hereupon, the solution solidifies to a jelly. 300 ml of ether are then added, the product is triturated, filtered off and dried, and the insoluble powder is triturated with 200 ml of water, filtered off, dried and crystallised from ethyl acetate-hexane. 15 g of Z-Asn-Ile-Gly-OMe of melting point 218°–219°C are obtained.

b. H-Asn-Ile-Gly-OMe 14 g of Z-Asn-Ile-Gly-OMe are suspended in 500 ml of DMF and hydrogenated with 1 g of palladium on charcoal (10% of Pd). Hereupon, the starting material dissolves. After completion of the hydrogenation, the catalyst is filtered off and the filtrate is evaporated to dryness. 9.7 g of H-Asn-Ile-Gly-OMe, which is free from starting material, are obtained.

c. Z-Thr(tBu)-Asn-Ile-Gly-OMe

A mixture of 9.5 g of H-Asn-Ile-Gly-OMe, 80 ml of DMF and 13.6 g of Z-Thr(tBu)-OSu is left to stand for 18 hours at 25°C, whereupon it solidifies completely. 300 ml of ether are added and the product is triturated, filtered off and dried. It is then triturated with 200 ml of water, filtered off and dried. The residue is crystallised from ethanol; 12.4 g, melting point 207°–208°C.

d. H-Thr(tBu)-Asn-Ile-Gly-OMe 11.0 g of Z-Thr(tBu)-Asn-Ile-Gly-OMe are dissolved in 500 ml of DMF with warming and are hydrogenated in the presence of 1 g of palladium on charcoal (10% of Pd). After the absorption of hydrogen has ceased, the catalyst is filtered off and the filtrate is evaporated to dryness. 8.0 g of H-Thr(tBu)-Asn-Ile-Gly-OMe are obtained; in thin layer chromatography on silica gel plates Rf(43A) = 0.12; Rf = 0.28 in the system chloroform-methanol (70:30).

e. Z-Gln-Thr(tBu)-Asn-Ile-Gly-OMe.

7.5 g of H-Thr(tBu)-Asn-Ile-Gly-OMe are dissolved in 100 ml of DMF and 7.7 g of Z-Gln-ONp are added. The reaction mixture slowly solidifies to a solid mass.

After 18 hours at room temperature, 375 ml of ether are added and the product is thoroughly triturated, filtered off, dried, triturated with 250 ml of water, filtered off and again dried. It is then precipitated from trifluoroethanol-water; 11 g are obtained; melting point 275°–277°C. The product is very sparingly soluble in the customary organic solvents.

f. H-Gln-Thr(tBu)-Asn-Ile-Gly-OMe 8.5 g of Z-Gln-Thr(tBu)-Asn-Ile-Gly-OMe are suspended in 500 ml of DMF and hydrogenated in the presence of 1.5 g of palladium on charcoal (10% of Pd). In the course thereof, the initially insoluble starting material dissolves. After completion of the hydrogenation, the catalyst is filtered off and the filtrate is evaporated; 6.5 g of H-Gln-Thr(tBu)-Asn-Ile-Gly-OMe are obtained as a resin. In thin layer chromatography on silica gel plates, Rf(43C) = 0.20; Rf(101A) = 0.16.

g. Z-Thr(tBu)-Phe-Pro-Gln-Thr(tBu)-Asn-Ile-Gly-OMe 6.0 g of H-Gln-Thr(tBu)-Asn-Ile-Gly-OMe are dissolved in 500 ml of DMF and 5.8 g of Z-Thr(tBu)-Phe-Pro-OH, 2.3 g of N-hydroxysuccinimide and 3 of dicyclohexylcarbodiimide are added. The reaction mixture is stirred for 16 hours at room temperature, the dicyclohexylurea is filtered off and the filtrate is concentrated to a volume of 200 ml and poured into 1.5 litres of ether. The mixture is then left to stand for 3 hours at 0°C and the fine precipitate is filtered off (10 g of powder). The powder is triturated with 200 ml of water, filtered off and dried. 9.6 g of crude product are obtained and are next triturated with ethyl acetate for further purification. The product is filtered off, dried, suspended in acetone, again filtered off and dried. The insoluble product (9.3 g) is sufficiently pure for further conversion. In thin layer chromatography on silica gel plates, Rf(102A) = 0.66.

h. Z-Thr(tBu)-Phe-Pro-Gln-The(tBu)-Asn-Ile-Gly-OH 3.1 g of Z-Thr(tBu)-Phe-Pro-Gln-Thr(tBu)-Asn-Ile-Gly-OMe are dissolved in a mixture of 155 ml of methanol, 45 ml of dioxane and 55 ml of water, with warming. The mixture is then cooled to room temperature, 8 ml of 1.0 N NaOH are added and the whole is left to stand for 30 minutes at room temperature.

It is now cooled to 0°C and 150 ml of ice water and 24 ml of 1.0 N HCl are added. The precipitate is filtered off, rinsed with ice water and dried. 2.56 g of powder are obtained and prove to be a single substance according to thin layer chromatography; Rf(45) =0.21; Rf(100) = 0.19.

c. H-Thr(tBu)-Phe-Pro-Gln-Thr(tBu)-Asn-Ile-Gly-OH 2.37 g of Z-Thr(tBu)-Phe-Pro-Gln-Thr(tBu)-Asn-Ile-Gly-OH are dissolved in 60 ml of 80% strength acetic acid and hydrogenated in the presence of 200 mg of palladium on charcoal (10% of Pd). After completion of the hydrogenation, the catalyst is filtered off, the filtrate is evaporated and the residue is dried. 2.28 g of resin are obtained and prove, in thin layer chromatography, to be free of non-hydrogenated starting material; RF(52) = 0.21; Rf(107) = 0.55.

k. Z-Asn-Lys(Boc)-Phe-His-Thr(tBu)-Phe-Pro-Gln-Thr(tBu)-Asn-Ile-Gly-OH 1.41 g of Z-Asn-Lys(BOC)-Phe-His-NHNH$_2$ are dissolved in 20 ml of DMF and the solution is cooled to −30°C. 1.5 ml of 3.2 N HCl in dioxane are then added, followed by 0.29 ml of tert.-butyl nitrite. The mixture is then allowed to rise to −12°C and is stirred for 15 minutes at −12°C. A solution, cooled to 0°C, of 1.65 g of H-Thr(tBu)-Phe-Pro-Gln-Thr(tBu)-Asn-Ile-Gly-OH and 1.2 ml of a 40% strength solution of trimethylbenzylammonium hydroxide in methanol, in 30 ml of DMF and 6 ml of water, is then added dropwise. The mixture is stirred whilst cooling with ice and additionally 1.1 ml of N-ethyldiisopropylamine are introduced over the course of 30 minutes.

The mixture is left to stand for 5 hours at 0°C, during which time a jelly-like precipitate separates out. The reaction mixture is then poured into 300 ml of 1% strength acetic acid, the whole is stirred for 2 hours at 0°C, and the precipitate is filtered off. It is rinsed with water and dried, 50 ml of methanol are added and the mixture is stirred for 2 hours at room temperature. The methanol-insoluble Z-Asn-Lys(Boc)-Phe-His-Thr(tBu)-Phe-Pro-Gln-Thr(tBu)-Asn-Ile-Gly-OH is then filtered off.

399 mg are obtained; in thin layer chromatography on silica gel plates, Rf(100) =0.18; Rf(52) = 0.24; Rf(70) = 0.33.

l. Z-Asn-Lys(Boc)-Phe-His-Thr(tBu)-Phe-Pro-Gln-Thr(tBu)-Asn-Ile-Gly-Val-Gly-Ala-Pro-NH₂

62 mg of dicyclohexylcarbodiimide and 103 mg of H-Val-Gly-Ala-Pro-NH₂ are added to a mixture of 420 mg of Z-Asn-Lys(Boc)-Phe-His-Thr(tBu)-Phe-Pro-Gln-Thr(tBu)-Asn-Ile-Gly-OH, 55 mg of N-hydroxysuccinimide and 7 ml of DMF, whilst stirring. The mixture is then warmed to 45°C and stirred for 5 hours at this temperature. It is then cooled to 0°C and poured into 80 ml of ice-cold ether. The precipitate is filtered off, dried and further purified by reprecipitating it once from DMF-acetone and then from DMG-acetonitrile; 420 mg of the hexadecapeptide mentioned in the title are obtained; in thin layer chromatography on silica gel plates, Rf(100) = 0.25; Rf(107) = 0.60.

m. H-Asn-Lys(Boc)-Phe-His-Thr(tBu)-Phe-Pro-Gln-Thr(tBu)-Asn-Ile-Gly-Val-Gly-Ala-Pro-NH₂

395 mg of the product obtained under (l) are dissolved in 25 ml of 80% strength acetic acid and hydrogenated in the presence of 100 mg of palladium on charcoal (10% of Pd). After completion of the hydrogenation, the catalyst is filtered off and the filtrate is evaporated to dryness. 380 mg of product which is free from starting material according to thin layer chromatography on silica gel plates are obtained; Rf(107) = 0.30.

n. Z-Thr(tBu)-Tyr(tBu)-Thr(tBu)-Gln-Asp-(OtBu)-Phe-Asn-Lys-(Boc)-Phe-His-Thr(tBu)-Phe-Pro-Gln-Thr(tBu)-Asn-Ile-Gly-Val-Gly-Ala-Pro-NH₂

358 mg of Z-Thr(tBu)-Tyr(tBu)-Thr(tBu)-Gln-Asp(OtBu)-Phe-NHNH₂ are dissolved in 3 ml of DMF by warming, the solution is cooled to −20°C and 0.26 ml of 3.2 N HCl in dioxane is added, followed by 0.045 ml of t-butyl nitrite. The mixture is stirred for 15 minutes at −15°C. A solution, cooled to 0°C, of 380 mg of the product obtained under m), in a mixture of 10 ml of DMF, 2 ml of acetonitrile, 2 ml of dimethylsulphoxide and 0.2 ml of N-ethyl-diisopropylamine is then added and the whole is stirred for 18 hours at 0°C. The product which has precipitated is filtered off and is purified by twice reprecipitating it from DMF-ethyl acetate. The powder is then stirred with 20 ml of methanol and the methanol-insoluble product is filtered off and dried. 240 mg of the peptide mentioned in the title are obtained. In thin layer chromatography on silica gel plates, the product shows Rf(43C) = 0.40; Rf(100) = 0.28; Rf(96) = 0.42.

o. N-Thr(tBu)-Tyr(tBu)-Thr(tBu)-Gln-Asp(OtBu)-Phe-Asn-Lys(Boc)-Phe-His-Thr(tBu)-Phe-Pro-Gln-Thr(tBu)-Asn-Ile-Gly-Val-Gly-Ala-Pro-NH₂

220 mg of the product obtained under n) are dissolved in 15 ml of 80% strength acetic acid and hydrogenated in the presence of 20 mg of palladium on charcoal (10% of Pd). After completion of the hydrogenation, the catalyst is filtered off and the filtrate is evaporated to dryness. 210 mg of residue are obtained. To remove the acetic acid, the residue is dissolved in 15 ml of n-butanol saturated with water and the solution is washed with dilute NaHCO₃ solution and thereafter repeatedly with water. The butanol phase is then evaporated to dryness, whereby 202 mg of the peptide mentioned in the title are obtained free of acetic acid. Thin layer chromatography on silica gel plates shows Rf(96) = 0.40; Rf(43C) = 0.32.

p. Boc-Cys-Gly-Asn-Leu-Ser(tBu)-Thr(tBu)-Cys-Met-Leu-Gly-Thr(tBu)-Tyr(tBu)-Thr(tBu)-Gln-Asp(OtBu)-Phe-Asn-Lys(Boc)-Phe-His-Thr-(tBu)-Phe-Pro-Gln-Thr(tBu)-Asn-Ile-Gly-Val-Gly-Ala-Pro-NH₂

25 mg of dicyclohexylcarbodiimide are added to a mixture of 97 mg of Boc-Cys-Gly-Asn-Leu-Ser(tBu)-Thr-(tBu)-Cys-Met-Leu-Gly-OH, 195 mg of the peptide obtained under (o), 16 mg of N-hydroxybenzotriazole and 3 ml of DMF and the whole is stirred for 5 hours at 45°C under nitrogen. The reaction mixture is then poured into 50 ml of ice-cold peroxide-free ether and the fine precipitate is filtered off. It is purified by reprecipitating it twice from DMF-water and twice from DMF-ethyl acetate. 120 mg of the protected peptide mentioned in the title are thus obtained. In thin layer chromatography on silica gel plates, Rf(52A) = 0.31; Rf(100) = 0.17 ; Rf(107) = 0.65.

We claim:

1. A peptide of the formula I

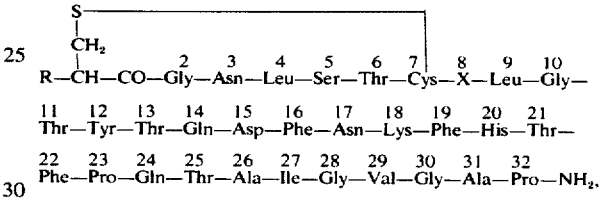

wherein X represents L-methionine, L-valine, L-norvaline, L-leucine, L-isoleucine, L-norleucine or L-α-aminobutyric acid radical and wherein L-alanine²⁶ is replaced by L-asparagine and/or L-isoleucine²⁷ is replaced by L-threonine and wherein, optionally, one or more of the aminoacids in positions 11, 12, 16, 19, 22 and 24 is or are replaced by another aminoacid, namely L-threonine¹¹ by L-lysine, L-tyrosine¹² by L-leucine, L-phenylalanine¹⁶ by L-leucine, L-phenylalanine¹⁹ by L-leucine, L-phenylalanine²² by L-tyrosine and L-glutamine²⁴ by L-arginine, R is hydrogen, free amino or acylamino in which acyl is a lower mono-basic or dibasic alkanoyl, lower alkyloxycarbonyl, benzyloxycarbonyl, L-pyroglutamyl, carbamoyl, N-lower alkylcarbamoyl, N-phenylcarbamoyl, or N-phenylthiocarbamoyl, its acid addition salts and complexes with a member selected from the group consisting of zinc phosphate, zinc pyrophosphate and zinc hydroxide, polyhydroxy gelatine, polyphloretine phosphate, polyphosphates and polyglutamic acid.

2. A compound as claimed in claim 1, said compound being Asn²⁶-Thr²⁷-calcitonin M.

3. A compound as claimed in claim 1, said compound being desamino-Asn²⁶-Thr²⁷-calcitonin M.

4. A compound as claimed in claim 1, said compound being desamino-Val⁸-Lys¹¹-Leu¹²-Tyr²²-Asn²⁶-Thr²⁷-calcitonin M.

5. A compound as claimed in claim 1, said compound being desamino-Lys¹¹-Leu¹²,¹⁶,¹⁹-Tyr²²-Asn²⁶-Thr²⁷-calcitonin M.

6. A compound as claimed in claim 1, said compound being Lys¹¹-Leu¹²,¹⁶,¹⁹-Tyr²²-Asn²⁶-Thr²⁷calcitonin M.

7. A compound as claimed in claim 1, said compound being Thr²⁷-calcitonin M.

8. A compound as claimed in claim 1, said compound being Leu¹²-Thr²⁷-calcitonin M.

9. A compound as claimed in claim 1, said compound being Leu¹²-Asn²⁶-Thr²⁷-calcitonin M.

10. A compound as claimed in claim 1, said compound being Asn²⁶-calcitonin M.

* * * * *